(12) United States Patent
Hirai et al.

(10) Patent No.: US 8,154,977 B2
(45) Date of Patent: Apr. 10, 2012

(54) REFLECTING WAVELENGTH PLATE AND OPTICAL PICKUP USING REFLECTING WAVELENGTH PLATE

(75) Inventors: Hideaki Hirai, Kanagawa (JP); Kazuhiro Umeki, Iwate (JP); Toshimichi Nasukawa, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/842,369

(22) Filed: Jul. 23, 2010

(65) Prior Publication Data

US 2010/0278029 A1  Nov. 4, 2010

(30) Foreign Application Priority Data

Sep. 3, 2008 (JP) ................... 2008-225766
Apr. 7, 2009 (JP) ................... 2009-092975
Aug. 31, 2009 (JP) ................... 2009-199685

(51) Int. Cl.
*G11B 7/00* (2006.01)
(52) U.S. Cl. .............. 369/112.16; 369/122.29
(58) Field of Classification Search .......... None
See application file for complete search history.

(56) References Cited

U.S. PATENT DOCUMENTS

| 7,009,929 | B2* | 3/2006 | Motegi | 369/112.16 |
| 7,197,003 | B2 | 3/2007 | Hirai et al. | |
| 7,889,620 | B2* | 2/2011 | Fukakusa et al. | 369/112.19 |
| 2007/0217011 | A1 | 9/2007 | Kiyosawa et al. | |
| 2008/0106789 | A1 | 5/2008 | Hirai et al. | |
| 2009/0231982 | A1* | 9/2009 | Hirai | 369/112.04 |
| 2010/0091632 | A1* | 4/2010 | Ogata | 369/112.16 |

FOREIGN PATENT DOCUMENTS

| JP | 3545008 | 4/2004 |
| JP | 2005-141849 | 6/2005 |
| JP | 2005-285305 | 10/2005 |
| JP | 2008-107394 | 5/2008 |
| JP | 2008-139618 | 6/2008 |

OTHER PUBLICATIONS

Horinouchi, Shogo, "12.7 mm slim type BD drive", *Panasonic Technical Journal*, vol. 54, No. 3, pp. 15-20, published by Panasonic Corporation, Oct. 28, 2008.
Kikuta, Hisao, "Structural double refraction and application to optical element", *Introduction to Diffraction Optical Element*, published by The Optronics Co., Ltd., 1$^{st}$ ed., pp. 158-167, May 20, 1998 (and partial English translation thereof).

* cited by examiner

*Primary Examiner* — Joseph Haley
(74) *Attorney, Agent, or Firm* — Cooper & Dunham LLP

(57) ABSTRACT

Disclosed is a reflecting wavelength plate that deflects and reflects a light path and adds a phase difference with respect to plural incident light having different wavelengths. The reflecting wavelength plate includes a substrate; a reflecting film laminated on the substrate; and a sub-wavelength concavo-convex structure that is laminated on the reflecting film and has a pitch less than or equal to the shortest wavelength of the plural incident light. The filling factor and the groove depth of the sub-wavelength concavo-convex structure are determined so as to add the phase difference obtained by $(k\pi)/8$, where k is an integer, to the plural incident light having the different wavelengths.

2 Claims, 29 Drawing Sheets

REFLECTING WAVELENGTH PLATE AND OPTICAL PICKUP USING REFLECTING WAVELENGTH PLATE

BACKGROUND

1. Technical Field

This disclosure relates to reflecting wavelength plates and optical pickups having the reflecting wavelength plates and, in particular, to the reflecting wavelength plate of an optical element suitable for converting light emitted from a light source into a proper polarization state and an optical pickup using the reflecting wavelength plate.

2. Description of the Related Art

A known optical pickup is configured in the manner as shown in FIG. 1. In FIG. 1, emitted light as coherent light emitted from the light source 1 of a semiconductor laser is emitted as linear polarized light and directed toward an optical information recording medium (optical recording medium 8) as forward-traveling light. First, the emitted light is incident on a diffraction element 2 for three beams and diffracted. Thus, three forward-traveling beams are generated as the forward-traveling light and emitted toward a polarization beam splitter 3. The three forward-traveling beams are reflected by the polarization beam splitter 3 that reflects the polarization component of the forward-traveling light, so that the path of the three forward-traveling beams is bent by 90 degrees. The three forward-traveling beams are converted into parallel light by a collimating lens 4, deflected 90 degrees by a deflecting mirror 5, and incident on a (¼) wavelength plate 6. The three forward-traveling beams are converted from the linear polarized light to circular polarized light by the (¼) wavelength plate 6 and emitted to an objective lens 7. Then, the objective lens 7 causes the three forward-traveling beams to converge onto the optical recording medium 8 (forward path).

The three forward-traveling beams emitted from the objective lens 7 are incident and converged onto the recording surface of the optical recording medium 8, and then three backward-traveling beams are reflected to the objective lens 7 in the direction opposite to an incident direction by the recording surface as backward-traveling light. Thus, the main beam of the three forward-traveling-beams is configured to, for example, read information from the recording surface or write information on the recording surface. Furthermore, the sub-beam of the three forward-traveling beams is used for detecting a track error signal.

The three backward-traveling beams reflected by the recording surface of the optical recording surface 8 are incident on the objective lens 7, converted into parallel light by the objective lens 7, and emitted to the (¼) wavelength plate 6. The three backward-traveling beams emitted from the objective lens 7 are incident on the (¼) wavelength plate 6, converted from the circular polarized light to the linear polarized light in the deflecting direction orthogonal to the forward-traveling light by the (¼) wavelength plate 6, and emitted to collimating lens 4. The three backward-traveling beams emitted from the (¼) wavelength plate 6 are incident on the collimating lens 4 and converted into converging light by the collimating lens 4. The three backward-traveling beams permeate the polarization beam splitter 3 that allows permeation of the light of a polarization component orthogonal to the forward-traveling light, permeate a detection lens 9, and are incident on a light receiving element 10. The three backward-traveling beams are converted into an electrical signal by the light receiving element 10 (backward path).

However, in the optical pickup having the above-described configuration, the (¼) wavelength plate 6 arranged between the objective lens 7 and the deflecting mirror 5 causes a bottleneck for reducing the thickness of the optical pickup to thin the optical pickup. Patent Document 1 discloses a technology for solving this problem.

The invention of Patent Document 1 is related to an optical pickup device that records and reproduces data on and from an optical recording medium by using laser light emitted from a semiconductor laser element. In this optical pickup device, a (½) wavelength plate (reflecting wavelength plate) that deflects light source light is arranged on an incline by approximately 45 degrees with respect to the optical axis of an objective lens that converges the light source light onto the optical recording medium. This (½) wavelength plate converts linear polarized light into circular polarized light.

As described above, the light source light is deflected into the objective lens by the (½) wavelength plate, and the polarized light from the light source light is converted from the linear polarized light to the circular polarized light. This configuration allows the conventionally-required deflecting mirror 5 and the (¼) wavelength plate 6 to be used in common, whereby optical elements can be eliminated. Moreover, this configuration allows the optical pickup device to be thinner than it otherwise would be.

Meanwhile, the (½) wavelength plate of Patent Document 1 is made of a crystal plate, and the wavelength of the light source light is 790 nm. It is generally known that uniaxial anisotropy crystals such as artificial or natural rutile, calcite, and crystal can be used as the wavelength plate. However, the artificial crystal are difficult to uniformly develop, while the optically-uniform and large natural crystal is hard to obtain and expensive.

In addition, the following problems must be taken into consideration. That is, an apparatus that can be configured to reproduce optical recording media of both a DVD and a CD is known. This apparatus requires light sources that separately emit light for a DVD and light for a CD each having a different wavelength. The apparatus uses the so-called twin-beam-type light source in which two light fluxes having different wavelengths are radiated on the same light path so that the light sources are used in common (see, for example, Patent Document 2). When the (½) wavelength plate shown in Patent Document 1 is provided in this twin beam optical system, the apparatus must adapt to the two wavelengths of a DVD and a CD. Moreover, it is known as another problem that the operating range of the wavelength plate made of a material using such a crystal is small.

Patent Document 1: JP-B2-3545008
Patent Document 2: JP-A-2005-141849
Non-Patent Document 1: "Structural double refraction and application to optical element" of Introduction to Diffraction Optical Element written by Hisao Kikuta belonging to the optical design group of the Optical Society of Japan of the Japan Society of Applied Physics and published by The Optronics Co., Ltd., on May 20, 1998, first edition, p 158 to p 167
Non-Patent Document 2: "12.7 mm slim type BD drive" in Panasonic Technical Journal, Vol. 54, No. 3 written by Shogo Horinouchi, Shohei Yumida, Tomohiro Matsuo and published by Panasonic Corporation on Oct. 28, 2008, p 15 to p 20

SUMMARY

In an aspect of this disclosure, there is provided a reflecting wavelength plate that operates even if plural light sources, such as a twin-beam-type light source and the light source of three wavelengths, are used and an optical pickup using the reflecting wavelength plate.

In another aspect of this disclosure, there is provided a reflecting wavelength plate that deflects and reflects a light path and adds a phase difference with respect to plural incident light having different wavelengths. The reflecting wavelength plate includes a substrate; a reflecting film laminated on the substrate; and a sub-wavelength concavo-convex structure that is laminated on the reflecting film and has a pitch less than or equal to the shortest wavelength of the plural incident light. The filling factor and the groove depth of the sub-wavelength concavo-convex structure are determined so as to add the phase difference obtained by $(k\pi)/8$, where k is an integer, to the plural incident light having the different wavelengths.

In yet another aspect of this disclosure, there is provided an optical pickup used for performing recording, reproduction, or deletion of information with respect to two types of optical recording media A and B having different used wavelengths. The optical pickup includes a light source A that emits light having a wavelength of $\lambda 1$; a light source B that emits light having a wavelength of $\lambda 2$ that is greater than $\lambda 1$; a converging unit that converges the light emitted from the light source A and the light emitted from the light source B onto recording surfaces as accessed objects of the recording media; a branch unit that is arranged on a light path between the converging unit and the light sources A and B and branches a return light flux through the converging unit; a light receiving unit that receives the return light flux branched by the branch unit at a predetermined light receiving position; and a reflecting wavelength plate that is arranged on the light path between the converging unit and the branch unit. The reflecting wavelength plate includes a substrate, a reflecting film laminated on the substrate, and a sub-wavelength concavo-convex structure that is laminated on the reflecting film and has a pitch less than or equal to a wavelength of $\lambda 1$, and the reflecting wavelength plate is configured so that the filling factor and the groove depth of the sub-wavelength concavo-convex structure are determined so as to add a phase difference obtained by $(k\pi)/8$, where k is an integer, to the light emitted from the light source A and the light emitted from the light source B.

In still another aspect of this disclosure, there is provided an optical pickup used for performing recording, reproduction, or deletion of information with respect to three types of optical recording media A, B, and C having different used wavelengths. The optical pickup includes a light source A that emits light having a wavelength of $\lambda 1$; a light source B that emits light having a wavelength of $\lambda 2$ that is greater than $\lambda 1$; a light source C that emits light having a wavelength of $\lambda 3$ that is greater than $\lambda 2$; a converging unit A that converges the light emitted from the light source A onto a recording surface as an accessed object of the optical recording medium; a converging unit BC that converges the light emitted from the light source B and the light emitted from the light source C onto recording surfaces as accessed objects of the optical recording media; a branch unit A that is arranged on a light path between the converging unit A and the light source A and branches a return light flux through the converging unit A; a branch unit BC that is arranged on a light path between the converging unit BC and the light sources B and C and branches a return light flux through the converging unit BC; a light receiving unit A that receives the return light flux branched by the branch unit A at a predetermine light receiving position; a light receiving unit BC that receives the return light flux branched by the branch unit BC at a predetermined light receiving position; a reflecting wavelength plate BC that is arranged on the light path between the converging unit BC and the branch unit BC; and a reflecting wavelength plate A that is arranged on the light path between the converging unit A and the reflecting wavelength plate BC. The reflecting wavelength plate BC includes a substrate, reflecting film laminated on the substrate, and a sub-wavelength concavo-convex structure that is laminated on the reflecting film and has a pitch less than or equal to a wavelength of $\lambda 1$. The reflecting wavelength plate BC is configured so that the filling factor and the groove depth of the sub-wavelength concavo-convex structure are determined so as to add a phase difference obtained by $(k\pi)/8$, where k is an integer, to the light emitted from the light source B and the light emitted from the light source C. The reflecting film reflects the light having a wavelength of $\lambda 2$ and the light having a wavelength of $\lambda 3$ and allows permeation of the light having a wavelength of $\lambda 1$. The reflecting wavelength plate A includes a substrate, a reflecting film laminated on the substrate, and a sub-wavelength concavo-convex structure that is laminated on the reflecting film and has a pitch less than or equal to a wavelength of $\lambda 1$. The reflecting wavelength plate A is configured so that the filling factor and the groove depth of the sub-wavelength concavo-convex structure are determined so as to add a phase difference obtained by $(k\pi)/8\pi-\Delta A$, where k is an integer, to the light emitted from the light source A if the phase difference added when the light having a wavelength of $\lambda 1$ permeates the reflecting wavelength plate BC is defined as $\Delta A$.

In another aspect of this disclosure, there is provided an optical pickup used for performing recording, reproduction, or deletion of information with respect to three types of optical recording media A, B, and C having different used wavelengths. The optical pickup includes a light source A that emits light having a wavelength of $\lambda 1$; a light source B that emits light having a wavelength of $\lambda 2$ that is greater than $\lambda 1$; a light source C that emits light having a wavelength of $\lambda 3$ that is greater than $\lambda 2$; a converging unit A that converges the light emitted from the light source A onto a recording surface as an accessed object of the optical recording medium; a converging unit BC that converges the light emitted from the light source B and the light emitted from the light source C onto recording surfaces as accessed objects of the optical recording media; a branch unit A that is arranged on a light path between the converging unit A and the light source A and branches a return light flux through the converging unit A; a branch unit BC that is arranged on a light path between the converging unit BC and the light sources B and C and branches a return light flux through the converging unit BC; a light receiving unit A that receives the return light flux branched by the branch unit A at a predetermined light receiving position; a light receiving unit BC that receives the return light flux branched by the branch unit BC at a predetermined light receiving position; a reflecting wavelength plate A that is arranged on the light path between the converging unit A and the branch unit A; and a reflecting wavelength plate BC that is arranged on the light path between the converging unit BC and the reflecting wavelength plate A. The reflecting wavelength plate A includes a substrate, a reflecting film laminated on the substrate, and a sub-wavelength concavo-convex structure that is laminated on the reflecting film and has a pitch less than or equal to a wavelength of $\lambda 1$. The reflecting wavelength plate A is configured so that the filling factor and the groove depth of the sub-wavelength concavo-convex structure are determined so as to add a phase difference obtained by $(k\pi)/8$, where k is an integer, to the light emitted from the light source A. The reflecting film reflects the light having a wavelength of $\lambda 1$ and allows permeation of the light having a wavelength of $\lambda 2$ and the light having a wavelength of $\lambda 3$. The reflecting wavelength plate BC includes a substrate, a reflecting film laminated on the substrate, and a sub-wavelength concavo-convex structure that is laminated on the reflecting film and has a pitch less than or equal to a wavelength of λ2. The reflecting wavelength plate BC is configured so that the filling factor and the groove depth of the sub-wavelength concavo-convex structure are determined so as to add a phase difference obtained by (kπ)/8π−(ΔB+ΔC), where k is an integer, to the light emitted from the light source B and the light emitted from the light source C if the phase differences added when the light having a wavelength of λ2 and the light having a wavelength of λ3 permeate the reflecting wavelength plate A are defined as ΔB and ΔC, respectively.

The aforementioned and other aspects, features and advantages will become more apparent from the following detailed description when read in conjunction with the accompanying drawings.

DETAILED DESCRIPTION OF THE PREFERRED EMBODIMENTS

Referring to the accompanying drawings, a description is now made of embodiments of the present invention.

Figure 1:
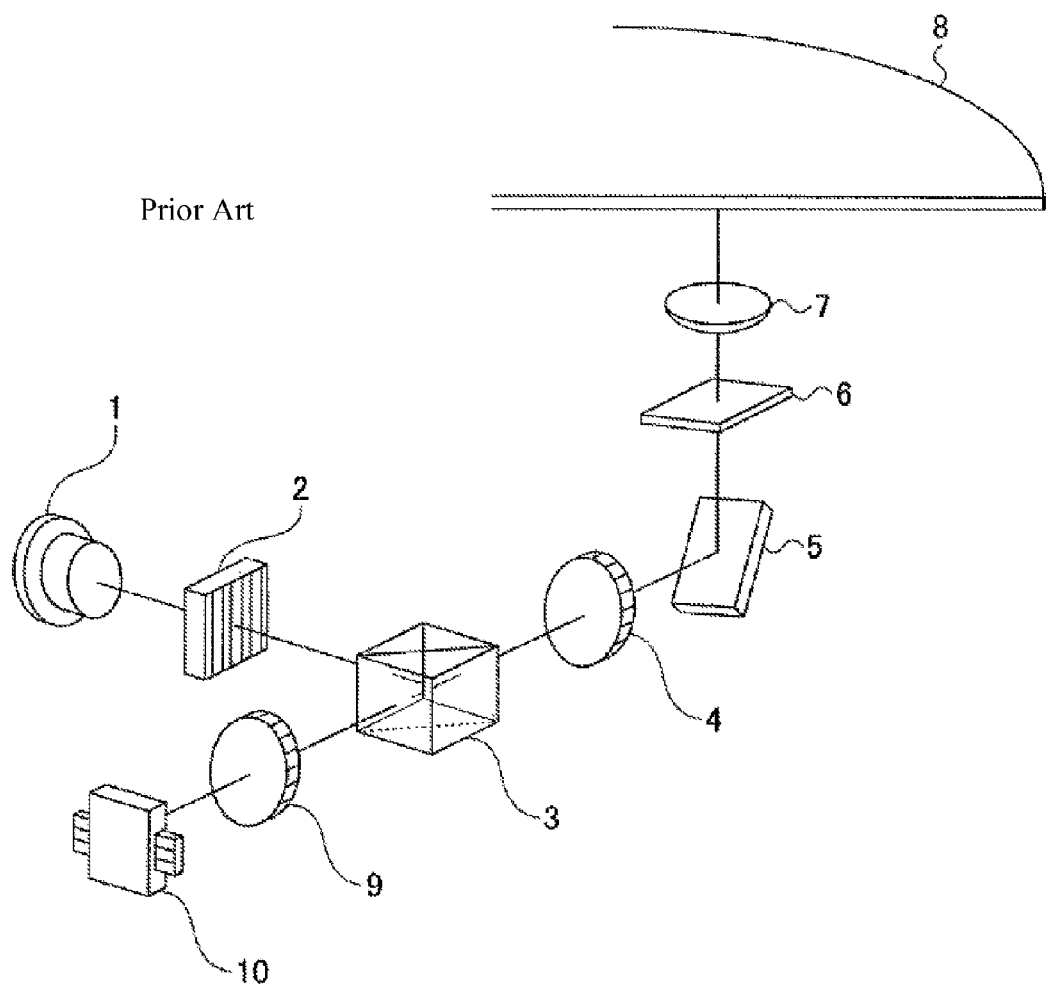
FIG. 1 is a view showing the schematic configuration of a conventional optical pickup.
Figure 2:
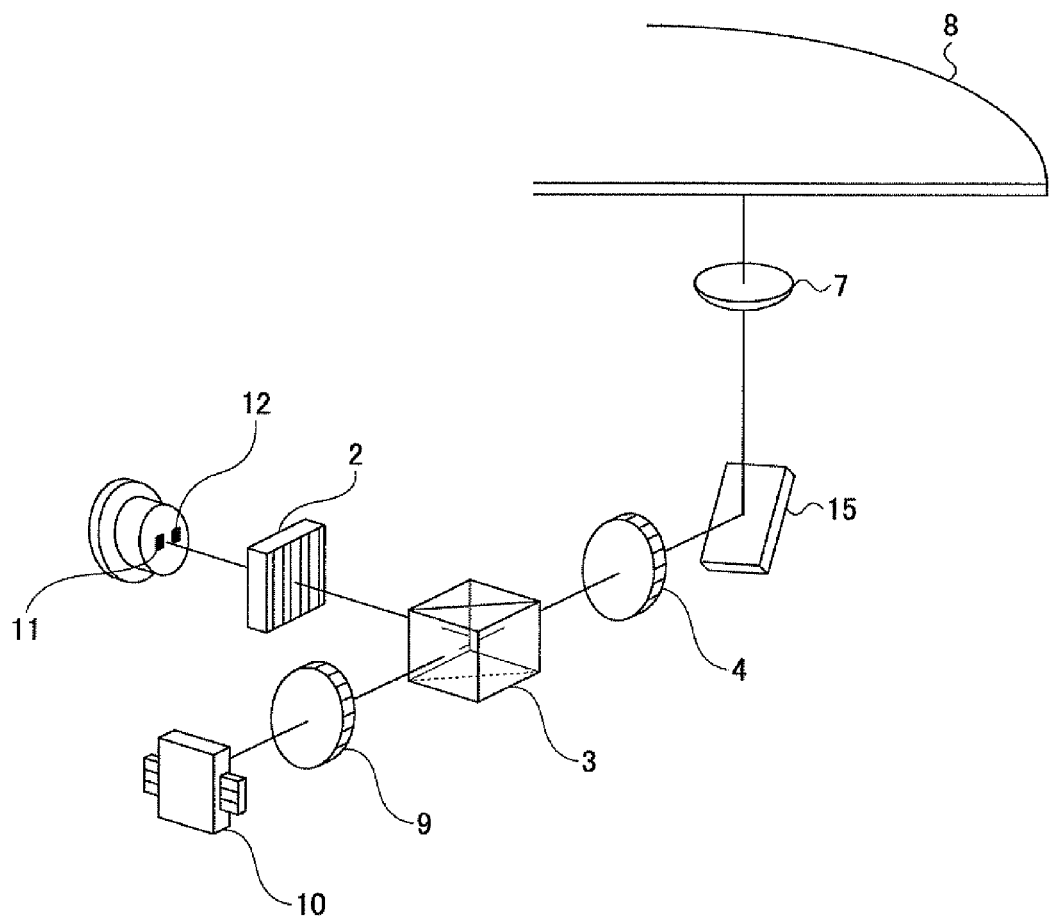
FIG. 2 is a view showing the schematic configuration of an optical pickup according to a first embodiment of the present invention.

FIG. 2 is a view showing the schematic configuration of an optical pickup according to a first embodiment of the present invention. The optical pickup shown in FIG. 1 uses a two-wavelength light source accommodated in a common package. In FIG. 2, reference numeral 2 denotes a diffraction element for three beams, reference numeral 3 denotes a polarization beam splitter, reference numeral 4 denotes a collimating lens, reference numeral 7 denotes an objective lens, reference numeral 8 denotes an optical recording medium, reference numeral 9 denotes a detection lens, reference numeral 10 denotes a light receiving element, reference numeral 11 denotes a semiconductor laser (for a DVD) of the light source, reference numeral 12 denotes a semiconductor laser (for a CD) of the light source, and reference numeral 15 denotes a reflecting (¼) wavelength plate.

Here, the diffraction element 2 for three beams divides the light emitted from the semiconductor lasers 11 and 12 into zero-order light (main light) and ±first-order light (sub-light) so that a track error signal is detected by a three-beam method, a DPP method, or the like. Thus, it is possible to obtain a reproduction signal from the detection signal of the zero-order light reflected by the optical recording medium 8 and obtain a track error signal by the calculation of the detection signals of the zero-order light and the ±first-order light reflected by the optical recording medium 8.

The polarization beam splitter 3 is a light path converter for converting moving paths between the path on which forward-traveling light is directed to the objective lens 7 where the light emitted from the semiconductor lasers 11 and 12 is converged and formed as a light spot on a recording medium, i.e., the optical recording medium 8 and the path on which backward-traveling light reflected by the optical recording medium 8 is guided into the light receiving element 10. That is, the polarization beam splitter 3 is a polarization dependence light-path converter for converting the path of the emitted light depending on polarization so as to satisfy demand for high efficiency in an optical system.

The collimating lens 4 converts the light scattered and emitted from the semiconductor lasers 11 and 12 into a parallel light flux and serves as a converging lens with respect to the backward-traveling light reflected by the optical recording medium 8 and directed to the light receiving element 10.

The objective lens 7 is a resinous diffractive lens that separately converges light onto, for example, a DVD-system optical recording medium and a CD-system optical recording medium. Furthermore, the objective lens 7 has a diffractive structure formed on its front surface and is capable of switching a condensing position and a numerical aperture in accordance with the wavelength of incident light. With respect to an incident-light flux having a wavelength of 66.0 nm, the objective lens 7 selects 0.65 as a numerical aperture (NA) and converges light onto the DVD-system optical recording medium. On the other hand, with respect to an incident-light flux having a wavelength of 785 nm, the objective lens 7 selects 0.50 as a numerical aperture (NA) and converges light onto the CD-system optical recording medium.

The optical recording medium 8 refers to the CD-system optical recording medium and the DVD-system optical recording medium.

The detection lens 9 is an astigmatism lens that generates astigmatism so as to enable detection of a focus error signal by an astigmatism method.

The light receiving element 10 receives light reflected by the optical recording medium 8 and detects an information signal and/or an error signal.

The optical pickup is a two-wavelength light source unit in which the light source 1 of the semiconductor laser 11 for a DVD made of laser diodes that emit light having a wavelength of 785 nm and the light source 1 of the semiconductor laser 12 for a CD made of laser diodes that emit light having a wavelength of 660 nm are accommodated in a common package. As the two-wavelength light source, a monolithic type in which the two-wavelength light source is formed on the same semiconductor substrate or a hybrid type in which chips are separately incorporated can be used. Furthermore, in the embodiments of the present invention, the polarization direction of the light emitted from the light source for a CD is the same as that of the light emitted from the light source for a DVD.

The reflecting (¼) wavelength plate 15 is arranged between the polarization beam splitter 3 and the objective lens 7 so as to satisfy demand for high efficiency in an optical system. The reflecting (¼) wavelength plate 15 is used as a unit for converting the polarization of incident light and has the function of deflecting the light path by 90 degrees.

For example, when reproducing information from the CD-system optical recording medium serving as the optical recording medium 8, the optical pickup emits light having a wavelength of 785 nm from the semiconductor laser (for a CD) 12. After passing through the diffraction element 2 for three beams, the polarization beam splitter 3, the collimating lens 4, and the reflecting (¼) wavelength plate 15, the emitted light is converged by the objective lens 7 onto the recording surface of the CD-system optical recording medium as an optical spot through the reflecting (¼) wavelength plate 15. Then, the backward-traveling light reflected by the recording surface of the CD-system optical recording medium is converged onto the light receiving element 10 through the polarization beam splitter 3. As a result, the information on the CD-system optical recording medium is reproduced based on a signal detected by the light receiving element 10.

Conversely, for example, when reproducing information from the DVD-system optical recording medium as the optical recording medium 8, the optical pickup emits light having a wavelength of 660 nm from the semiconductor laser (for a DVD) 11. Similarly, after passing through the diffraction element 2 for three beams, the polarization beam splitter 3, the collimating lens 4, and the reflecting (¼) wavelength plate 15, the emitted light is converged by the objective lens 7 onto the recording surface of the DVD-system optical recording medium serving as an optical spot. Then, the backward-traveling light reflected by the recording surface of the DVD-system optical recording medium is converged onto the light receiving element 10 through the polarization beam splitter 3. As a result, the information on the DVD-system optical recording medium is reproduced based on a signal detected by the light receiving element 10.

Next, a description is made of the flow of light in the optical pickup based on a DVD-system light path. When information is read from and written on the DVD-system optical recording medium, forward-traveling light is first incident from the semiconductor laser (for a DVD) 11 to the diffraction element 2 for three beams and diffracted. Thus, three DVD forward-traveling beams as the forward-traveling light are generated and emitted toward the polarization beam splitter 3. The three DVD forward-traveling beams are reflected by the polarization beam splitter 3 that reflects in the polarization direction of the forward-traveling light, so that the path of the three DVD forward-traveling beams are bent by 90 degrees. The three DVD forward-traveling beams are converted into parallel light by the collimating lens 4 and incident on the reflecting (¼) wavelength plate 15. The three DVD forward-traveling beams are converted from linear polarized light to circular polarized light by the reflecting (¼) wavelength plate 15, deflected 90 degrees, and emitted to the objective lens 7. Then, objective lens 7 causes the three DVD forward-traveling beams to converge onto the DVD-system optical recording medium 8 (forward path).

The three DVD forward-traveling beams emitted from the objective lens 7 are incident and converged onto the recording surface of the DVD-system optical recording medium 8, and then three DVD backward-traveling beams are reflected to the objective lens 7 in the direction opposite to an incident direction by the recording surface as backward-traveling light. Thus, the main beam of the three DVD forward-traveling beams is configured to, for example, read information from the recording surface or write information on the recording surface.

Furthermore, the sub-beam of the three DVD forward-traveling beams is used for detecting a track error signal. The three DVD backward-traveling beams reflected by the recording surface of the optical recording medium 8 are incident on the objective lens 7, converted into parallel light by the objective lens 7, and emitted to the reflecting (¼) wavelength plate 15. The three DVD backward-traveling beams emitted from the objective lens 7 are incident on the reflecting (¼) wavelength plate 15, converted from the circular polarized light to the linear polarized light of the polarization component orthogonal to the forward-traveling light by the reflecting (¼) wavelength plate 15, and emitted to collimating lens 4.

The three DVD backward-traveling beams emitted from the reflecting (¼) wavelength plate 15 are incident on the collimating lens 4 and converted into converging light by the collimating lens 4. The three DVD backward-traveling beams permeate the polarization beam splitter 3 that allows permeation of the light of a polarization component orthogonal to the forward-traveling light, permeate the detection lens 9, and are incident on the light receiving element 10. The three DVD backward-traveling beams are converted into an electrical signal by the light receiving element 10 (backward path).

Here, a description is specifically made of the reflecting (¼) wavelength plate provided in the optical pickup according to the first embodiment of the present invention.

Figure 3A:
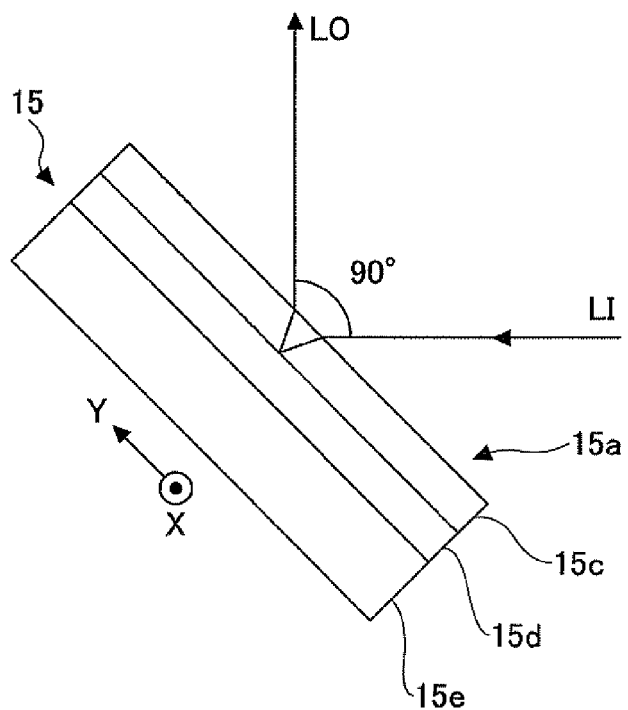
FIGS. 3A and 3B are a cross-sectional view and a perspective view showing the macrostructure of a reflecting wavelength plate according to the first embodiment, respectively.
Figure 3B:
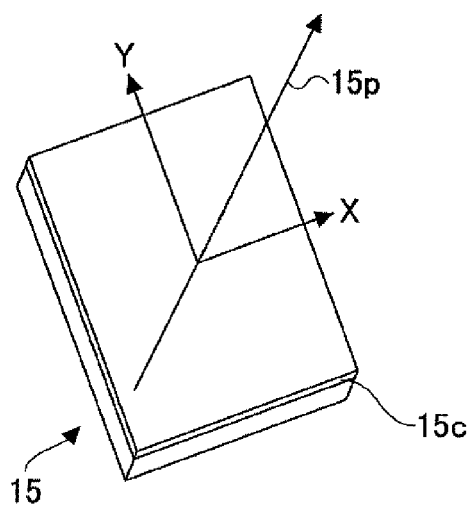

FIG. 3A is a cross-sectional view showing the macrostructure of the reflecting (¼) wavelength plate according to the first embodiment, and FIG. 3B is a perspective view of the reflecting (¼) wavelength plate. As shown in FIG. 3A, the reflecting (¼) wavelength plate 15 has a reflecting film 15d and a sub-wavelength concavo-convex structure 15c having the function of the (¼) wavelength plate arranged in this order on a glass substrate 15e. Note that compared with rear-surface coating in which the reflecting film 15d is provided at the rear surface of the glass substrate 15e on the side opposite to the sub-wavelength concavo-convex structure 15c, the configuration of the first embodiment is hardly susceptible to absorption and deflection inside the glass substrate 15e. Here in this embodiment, the glass substrate 15e is used as a substrate, but resin and metal may be used instead of a glass.

Furthermore, FIG. 3A shows a state in which light is refracted and reflected by the reflecting (¼) wavelength plate 15. The forward-traveling incident light LI from the light source is incident on the surface 15a of the reflecting (¼) wavelength plate 15, refracted at the surface 15a, permeates the inside of the sub-wavelength concavo-convex structure 15c, is reflected by the boundary surface between the reflecting film 15d and the sub-wavelength concavo-convex structure 15c, permeates the inside of the sub-wavelength concavo-convex structure 15c, is refracted at the surface 15a, and is emitted as emitted light LO. The emitted light LO and the incident light LI form an angle of 90 degrees.

Furthermore, as shown in FIG. 3B, the optical axis (f-axis) 15p of the reflecting (¼) wavelength plate 15 is set at an angle of 45 degrees relative to an x-direction and a y-direction. Therefore, linear polarized light in the x-direction is converted into circular polarized light.

Figure 4:
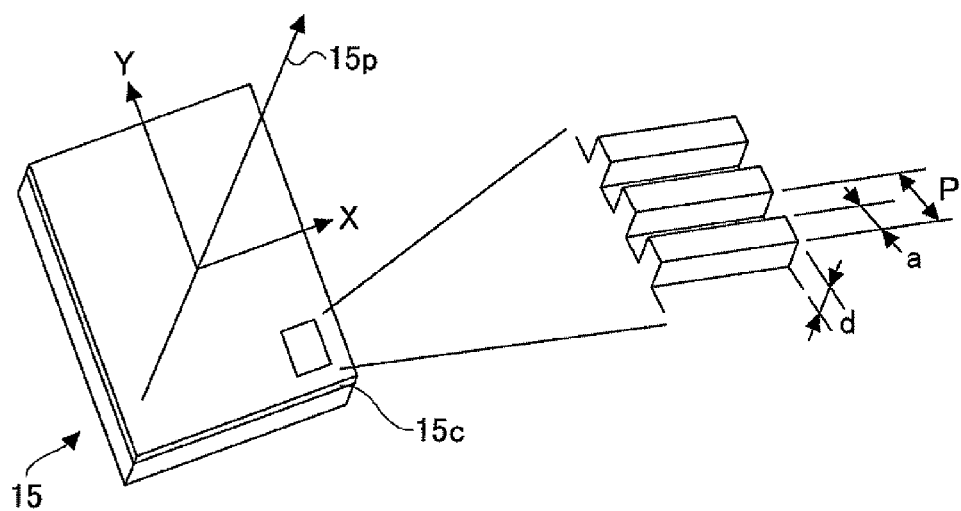
FIG. 4 is an enlarged view showing a sub-wavelength concave-convex structure formed in the reflecting wavelength plate according to the first embodiment.

FIG. 4 is an enlarged view showing the sub-wavelength concavo-convex structure formed in the reflecting (¼) wavelength plate. Here, the sub-wavelength concavo-convex structure 15c has a pitch P smaller than the wavelength of incident light. It is known that the pitch structure having the pitch P smaller than the wavelength of incident light does not diffract the incident light (i.e., the incident light directly permeates the pitch structure) and indicates a birefringence characteristic with respect to the incident light. In other words, the pitch structure indicates different refractive indexes in accordance with the polarization direction of the incident light. As a result, since a phase difference can be arbitrarily set in such a manner that parameters related to the structure are adjusted, various wavelength plates can be realized.

Furthermore, the optical pickup according to the embodiments of the present invention is not limited to the two-wavelength light source unit as described in the first embodiment shown in FIG. 2, but semiconductor lasers of separate packages may be used.

Figure 5:
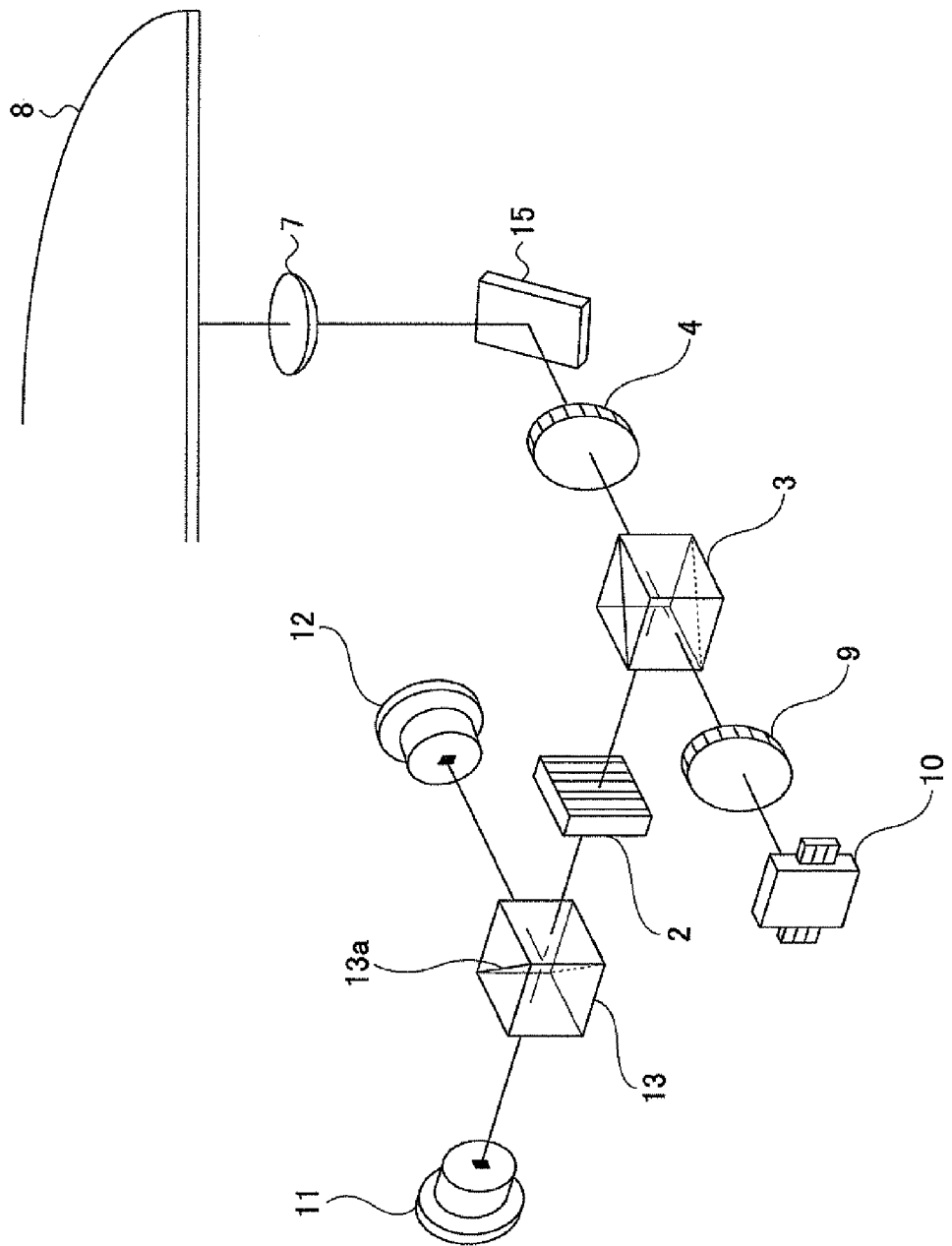
FIG. 5 is a view showing another schematic configuration of the optical pickup according to the first embodiment.

FIG. 5 is a view showing another configuration of the optical pickup according to the first embodiment of the present invention. In FIG. 5, instead of the semiconductor laser (light source 1) in which the semiconductor laser (for a DVD) 11 and the semiconductor laser (for a CD) 12 are accommodated in one package, the semiconductor laser (for a DVD) 11 and the semiconductor laser (for a CD) 12 are accommodated in separate packages to form the separate light source 1. As shown in FIG. 2, reference numeral 11 denotes a semiconductor laser (for a DVD), and reference numeral 12 denotes a semiconductor laser (for a CD). Reference numeral 13 denotes a dichroic prism having a multilayer film 13a that allows permeation of light having a wavelength of 660 nm and reflects light having a wavelength of 785 nm. With the multilayer film 13a, the dichroic prism can synthesize the light having a wavelength of 660 nm with the light having a wavelength of 785 nm and direct the synthesized light to the optical recording medium 8.

Figure 6:
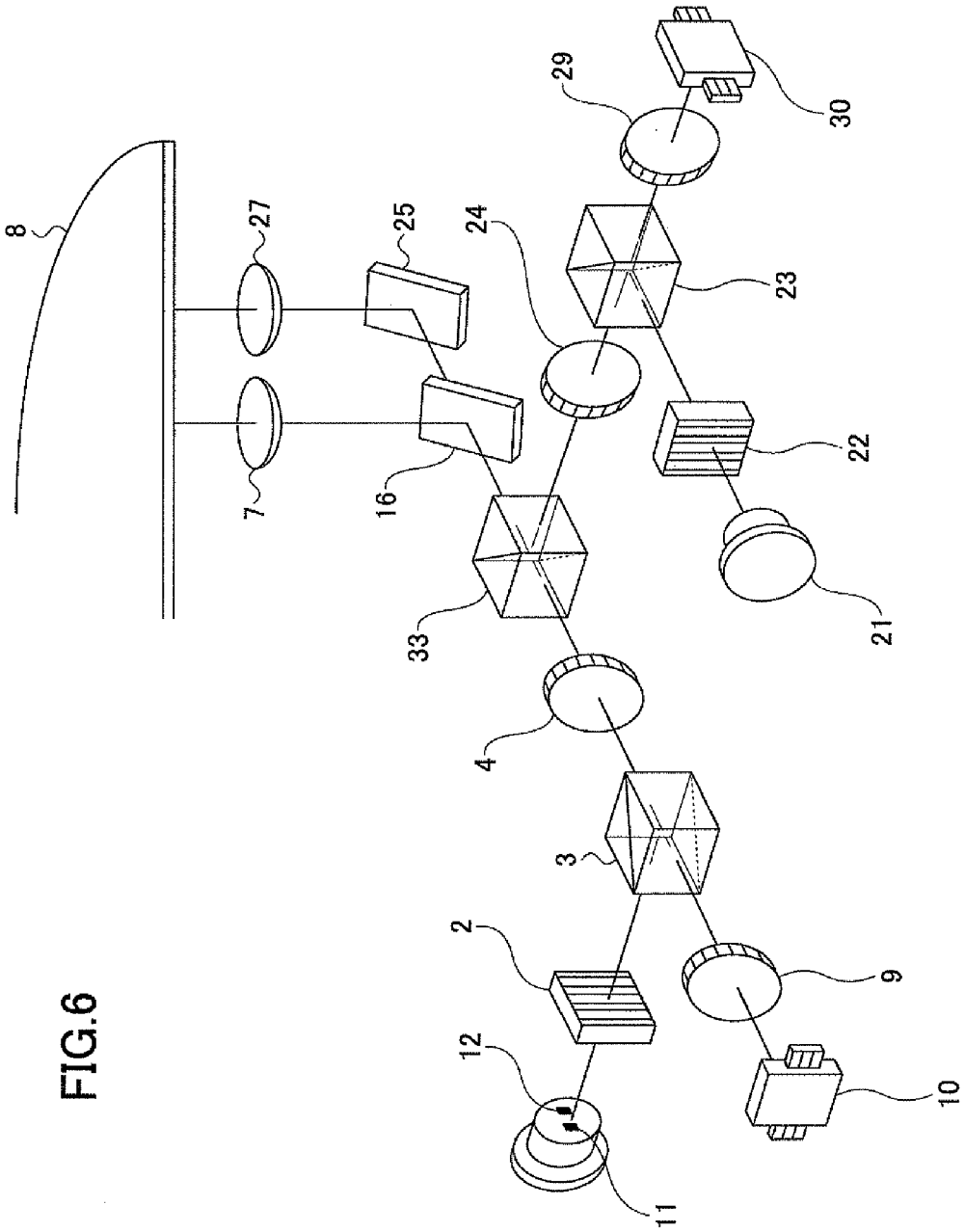
FIG. 6 is a view showing the optical pickup according to a second embodiment of the present invention.

FIG. 6 is a view showing the schematic configuration of the optical pickup according to a second embodiment of the present invention. Here in this embodiment, components having the same functions as those described with reference to FIG. 2 are denoted by the same reference numerals. The second embodiment shows the optical pickup that records/reproduces information on/from not only a DVD and a CD as described in the first embodiment but also a Blu-ray Disc (hereinafter referred to as a BD), which has been in widespread use. In this embodiment, a description is made of an example of the optical pickup using the reflective (¼) wavelength plate.

In FIG. 6, reference numeral 2 denotes the diffraction element for three beams, reference numeral 3 denotes the polarization beam splitter, reference numeral 4 denote the collimating lens, reference numeral 7 denotes the objective lens, reference numeral 8 denotes the optical recording medium, reference numeral 9 denotes the detection lens, reference numeral 10 denotes the light receiving element, reference numeral 11 denotes the semiconductor laser (for a DVD) of the light source, reference numeral 12 denotes the semiconductor laser (for a CD) of the light source, and reference numeral 16 denotes the reflecting (¼) wavelength plate. In addition, as components for a BD, reference numeral 21 denotes the semiconductor laser (for a BD) of the light source, reference numeral 22 denotes the diffraction element for three beams, reference numeral 23 denotes the polarization beam splitter, reference numeral 24 denotes the collimating lens, reference numeral 25 denotes the reflecting wavelength plate, reference numeral 27 denotes the objective lens, reference numeral 29 denotes the detection lens, reference numeral 30 denotes the light receiving element, and reference numeral 33 denotes the dichroic prism.

First, as for the components used when information is recorded/reproduced on/from the DVD-system optical recording medium and the CD-system optical recording medium, descriptions of the diffraction element 2 for three beams, the polarization beam splitter 3, the collimating lens 4, the objective lens 7, the detection lens 9, the light receiving element 10, the semiconductor laser (for a DVD) 11 of the light source, and the semiconductor laser 12 (for a CD) of the light source are omitted in this embodiment because they are the same as those described in the first embodiment.

The optical recording medium 8 according to the second embodiment refers to the CD-system optical recording medium, the DVD-system optical recording medium, and the BD-system optical recording medium described below. The reflecting (¼) wavelength plate 16 is arranged between the polarization beam splitter 3 and the objective lens 7 so as to satisfy demand for high efficiency in an optical system. The reflecting (¼) wavelength plate 16 is used as a unit for converting the polarization of incident light and has the function of deflecting a light path by 90 degrees. The reflecting (¼) wavelength plate 16 has a dichroic coating film formed on its reflecting surface that reflects light having a wavelength of 660 nm and light having a wavelength of 785 nm and allows permeation of light having a wavelength of 405 nm.

Furthermore, the dichroic prism 33 is coated with a dielectric multilayer film that reflects light having a wavelength of 660 nm and light having a wavelength of 785 nm and allows permeation of light having a wavelength of 405 nm.

Here, a description is made of components used when information is recorded on and reproduced from the BD-system optical recording medium. First, the semiconductor laser 21 is a semiconductor laser diode that emits light having a wavelength of 405 nm.

The diffraction element 22 for three beams divides the light emitted from the semiconductor laser 21 into zero-order light (main light) and ±first-order light (sub-light) so that a track error signal is detected by a three-beam method, a DPP method, or the like. Thus, it is possible to obtain a reproduction signal from the detection signal of the zero-order light reflected by the optical recording medium 8 and obtain a track error signal by the calculation of the detection signals of the zero-order light and the ±first-order light reflected by the optical recording medium 8.

The polarization beam splitter 23 is a light path converter for converting moving paths between the path on which forward-traveling light is directed to the objective lens 27 where the light emitted from the semiconductor laser 21 is converged and formed as a light spot on a recording medium, i.e., the optical recording medium 8 and the path on which backward-traveling light reflected by the optical recording medium 8 is guided into the light receiving element 30. That is, the polarization beam splitter 23 is a polarization dependence light-path converter for converting the path of the emitted light depending on polarization so as to satisfy demand for high efficiency in an optical system.

The collimating lens 24 converts the light scattered and emitted from the semiconductor laser 21 into a parallel light flux and serves as a converging lens with respect to the backward-traveling light reflected by the optical recording medium 8 and directed to the light receiving element 30.

The reflecting wavelength plate 25 is arranged between the polarization beam splitter 23 and the objective lens 27 so as to satisfy demand for high efficiency in an optical system. The reflecting wavelength plate 25 is used as a unit for converting the polarization of incident light and has the function of deflecting the light path by 90 degrees.

The objective lens 27 is a resinous or glass nonspherical mold lens that converges light onto the BD-system optical recording medium. The objective lens 27 has an opening formed at its front surface. With respect to an incident-light flux having a wavelength of 405 nm, the objective lens 27 converges light onto the BD-system optical recording medium with a numerical aperture (NA) of 0.85.

The detection lens 29 is an astigmatism lens that generates astigmatism so as to enable detection of a focus error signal by an astigmatism method.

The light receiving element 30 receives light reflected by the optical recording medium 8 and detects an information signal and/or an error signal.

For example, when reproducing information from the CD-system optical recording medium as the optical recording medium 8, the optical pickup emits light having a wavelength of 785 nm from the semiconductor laser (for a CD) 12. After passing through the diffraction element 2 for three beams, the polarization beam splitter 3, the collimating lens 4, the dichroic prism 33, and the reflecting (¼) wavelength plate 16, the emitted light is converged by the objective lens 7 onto the recording surface of the CD-system optical recording medium as an optical spot. Then, the backward-traveling light reflected by the recording surface of the CD-system optical recording medium is converged onto the light receiving element 10 through the polarization beam splitter 3. As a result, the information on the CD-system optical recording medium is reproduced based on a signal detected by the light receiving element 10.

Furthermore, for example, when reproducing information from the DVD-system optical recording medium as the optical recording medium 8, the optical pickup emits light having a wavelength of 660 nm from the semiconductor laser (for a DVD) 11. Similarly, after passing through the diffraction element 2 for three beams, the polarization beam splitter 3, the collimating lens 4, the dichroic prism 33, and the reflecting (¼) wavelength plate 16, the emitted light is converged by the objective lens 7 onto the recording surface of the DVD-system optical recording medium as an optical spot. Then, the backward-traveling light reflected by the recording surface of the DVD-system optical recording medium is converged onto the light receiving element 10 through the polarization beam splitter 3. As a result, the information on the DVD-system optical recording medium is reproduced based on a signal detected by the light receiving element 10.

Furthermore, for example, when reproducing information from the BD-system optical recording medium as the optical recording medium 8, the optical pickup emits light having a wavelength of 405 nm from the semiconductor laser (for a BD) 21. Similarly, after passing through the diffraction element 22 for three beams, the polarization beam splitter 23, the collimating lens 24, the dichroic prism 33, the reflecting (¼) wavelength plate 16, and the reflecting wavelength plate 25, the emitted light is converged by the objective lens 27 onto the recording surface of the BD-system optical recording medium as an optical spot. Then, the backward-traveling light reflected by the recording surface of the BD-system optical recording medium is converged onto the light receiving element 30 through the polarization beam splitter 23. As a result, the information on the BD-system optical recording medium is reproduced based on a signal detected by the light receiving element 30.

Next, a description is made of the flow of light in the optical pickup based on a DVD-system light path. When information is read from and written on the DVD-system optical recording medium, forward-traveling light is first incident from the semiconductor laser (for a DVD) 11 to the diffraction element 2 for three beams and diffracted. Thus, three DVD forward-traveling beams as the forward-traveling light are generated and emitted toward the polarization beam splitter 3. The three DVD forward-traveling beams are reflected by the polarization beam splitter 3 that reflects in the polarization direction of the forward-traveling light, so that the path of the three DVD forward-traveling beams are bent by 90 degrees. The three DVD forward-traveling beams are converted into parallel light, by the collimating lens 4, permeate the dichroic prism 33, and are incident on the reflecting (¼) wavelength plate 16. The three DVD forward-traveling beams are converted by the reflecting (¼) wavelength plate 16 from linear polarized light to circular polarized light, deflected 90 degrees, and emitted to the objective lens 7. Then, objective lens 7 causes the three DVD forward-traveling beams to converge onto the DVD-system optical recording medium 8 (forward path).

The three DVD forward-traveling beams emitted from the objective lens 7 are incident and converged onto the recording surface of the DVD-system optical recording medium 8, and then three DVD backward-traveling beams are reflected to the objective lens 7 in the direction opposite to an incident direction by the recording surface as backward-traveling light. Thus, the main beam of the three DVD forward-traveling beams is configured to, for example, read information from the recording surface or write information on the recording surface.

Furthermore, the sub-beam of the three DVD forward-traveling beams is used for detecting a track error signal. The three DVD backward-traveling beams reflected by the recording surface of the optical recording medium 8 are incident on the objective lens 7, converted into parallel light by the objective lens 7, and emitted to the reflecting (¼) wavelength plate 16. The three DVD backward-traveling beams emitted from the objective lens 7 are incident on the reflecting (¼) wavelength plate 16, converted from the circular polarized light to the linear polarized light of the polarization component orthogonal to the forward-traveling light by the reflecting (¼) wavelength plate 16, and emitted to collimating lens 4.

The three DVD backward-traveling beams emitted from the reflecting (¼) wavelength plate 16 permeate the dichroic prism 33, are incident on the collimating lens 4, and converted into converging light by the collimating lens 4. The three DVD backward-traveling beams permeate the polarization beam splitter 3 that allows permeation of the light of a polarization component orthogonal to the forward-traveling light, permeate the detection lens 9, and are incident on the light receiving element 10. The three DVD backward-traveling beams are converted into an electrical signal by the light receiving element 10 (backward path).

Similarly, light having a wavelength of 785 nm emitted from the semiconductor laser (for a CD) 12 follows the same light path, whereby information is recorded on and reproduced from the CD-system optical recording medium.

Next, a description is made of the flow of light in the optical pickup based on a BD-system light path according to the second embodiment. When information is read from and written on the BD-system optical recording medium, forward-traveling light is first incident from the semiconductor laser (for a BD) 21 to the diffraction element 22 for three beams and diffracted. Thus, three BD forward-traveling beams as the forward-traveling light are generated and emitted toward the polarization beam splitter 23. The three BD forward-traveling beams are reflected by the polarization beam splitter 23 that reflects in the polarization direction of the forward-traveling light, so that the path of the three BD forward-traveling beams are bent by 90 degrees. The three BD forward-traveling beams are converted into parallel light by the collimating lens 24, reflected by the dichroic prism 33, permeate the reflecting (¼) wavelength plate 16, and are incident on the reflecting wavelength plate 25. The three BD forward-traveling beams are converted by the reflecting wavelength plate 25 from linear polarized light to circular polarized light, deflected 90 degrees, and emitted to the objective lens 27. Then, objective lens 7 causes the three BD forward-traveling beams to converge onto the BD-system optical recording medium 8 (forward path).

The three BD forward-traveling beams emitted from the objective lens 27 are incident and converged onto the recording surface of the BD-system optical recording medium 8, and then three BD backward-traveling beams are reflected to the objective lens 27 in the direction opposite to an incident direction by the recording surface as backward-traveling light. Thus, the main beam of the three BD forward-traveling beams is configured to, for example, read information from the recording surface or write information on the recording surface.

Furthermore, the sub-beam of the three BD forward-traveling beams is used for detecting a track error signal. The three BD backward-traveling beams reflected by the recording surface of the optical recording medium 8 are incident on the objective lens 27, converted into parallel light by the objective lens 27, and emitted to the reflecting wavelength plate 25. The three BD backward-traveling beams emitted from the objective lens 27 are incident on the reflecting wavelength plate 25, converted from the circular polarized light to the linear polarized light of the polarization component orthogonal to the forward-traveling light by the reflecting wavelength plate 25, and emitted to collimating lens 24.

The three BD backward-traveling beams emitted from the reflecting wavelength plate 25 are reflected by the dichroic prism 33, incident on the collimating lens 24, and converted into converging light by the collimating lens 24. The three BD backward-traveling beams permeate the polarization beam splitter 23 that allows permeation of the light of a polarization component orthogonal to the forward-traveling light, permeate the detection lens 29, and are incident on the light receiving element 30. The three BD backward-traveling beams are converted into an electrical signal by the light receiving element 30 (backward path).

Figure 7A:
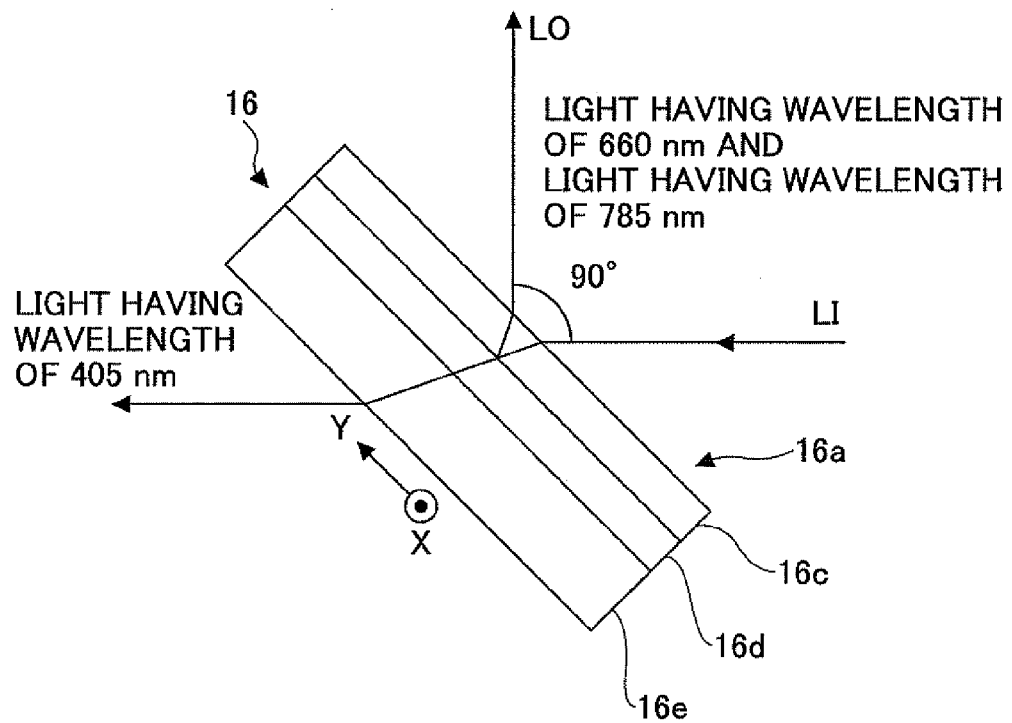
FIGS. 7A and 7B are a cross-sectional view and a perspective view showing the macrostructure of a reflecting wavelength plate according to the second embodiment, respectively.
Figure 7B:
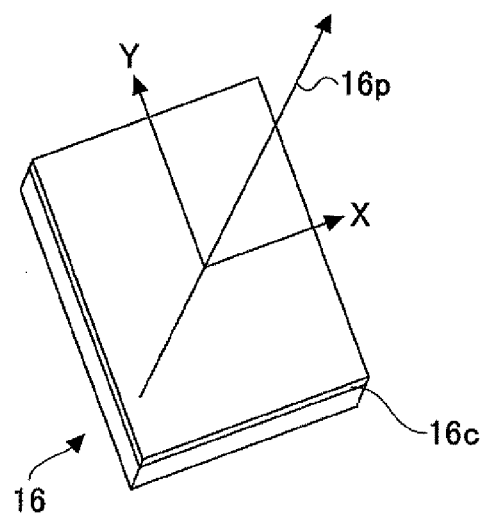

FIG. 7A is a cross-sectional view showing the macrostructure of the reflecting (¼) wavelength plate according to the first embodiment, and FIG. 7B is a perspective view of the reflecting (¼) wavelength plate. As shown in FIG. 7A, the reflecting (¼) wavelength plate 16 has a reflecting film 16d and a sub-wavelength concavo-convex structure 16c having the function of the (¼) wavelength plate arranged in this order on a glass substrate 16e. The reflecting film 16d is a dichroic coat formed of a dielectric multilayer film that reflects light having a wavelength of 660 nm and light having a wavelength of 785 nm and allows permeation of light having a wavelength of 405 nm.

Furthermore, FIG. 7A shows a state in which light is refracted and reflected by the reflecting (¼) wavelength plate 16. The forward-traveling incident light LI from the light source is incident on the surface 16a of the reflecting (¼) wavelength plate 16, refracted at the surface 16a, and permeates the inside of the sub-wavelength concavo-convex structure 16c: the light having a wavelength of 660 nm and the light having a wavelength of 785 nm are reflected by the boundary surface between the reflecting film 16d and the sub-wavelength concavo-convex structure 16c, permeate the inside of the sub-wavelength concavo-convex structure 16c, refracted at the surface 16a, and emitted as emitted light LO. The emitted light LO and the incident light LI form an angle of 90 degrees. On the other hand, the light having a wavelength of 405 nm directly permeates the sub-wavelength concavo-convex structure 16c, the reflecting film 16d, and the glass substrate 16e serving as the constituents of the reflecting (¼) wavelength plate 16.

Furthermore, as shown in FIG. 7B, the optical axis (f-axis) 16p of the reflecting (¼) wavelength plate 16 is set at an angle of 45 degrees relative to an x-direction and a y-direction. Therefore, linear polarized light having a wavelength of 660 nm and linear polarized light having a wavelength of 785 nm in the x-direction are converted into circular polarized light.

The enlarged view of the sub-wavelength concavo-convex structure 16c formed in the reflecting (¼) wavelength plate 16 is the same as that described in the first embodiment and can be expressed with reference to FIG. 4. Here, the sub-wavelength concavo-convex structure has a pitch P smaller than the wavelength of incident light. It is known that the pitch structure having the pitch P smaller than the wavelength of incident light does not diffract the incident light (i.e., the incident light directly permeates the pitch structure) and indicates a birefringence characteristic with respect to the incident light. In other words, the pitch structure indicates different refractive indexes in accordance with the polarization direction of the incident light. As a result, since a phase difference can be arbitrarily set in such a manner that parameters related to the structure are adjusted, various wavelength plates can be realized.

Note that the pitch P must be smaller than a wavelength of 405 nm for a BD as the shortest wavelength of incident light and more preferably half or less of a wavelength of 405 nm.

Furthermore, the macrostructure of the reflecting wavelength plate 25 according to the second embodiment is configured in the same manner as that of the reflecting (¼) wavelength plate shown in FIGS. 3A and 3B. However, the reflecting (¼) wavelength plate 16 also adds a phase difference to the light having a wavelength of 405 nm (see FIG. 6). Therefore, the reflecting wavelength plate 25 must be configured to add a phase difference in consideration of the phase difference added by the reflecting (¼) wavelength plate 16. Accordingly, the reflecting wavelength plate 25 does not serve as the so-called ¼ wavelength plate.

As shown in FIG. 3A, the reflecting wavelength plate 25(15) according to the second embodiment has the reflecting film 15d and the sub-wavelength concavo-convex structure 15c having the function of the wavelength plate arranged in this order on the glass substrate 15e. Furthermore, FIG. 3A shows a state in which light is refracted and reflected by the reflecting wavelength plate 25(15). The forward-traveling incident light LI from the light source is incident on the surface 15a of the reflecting wavelength plate 25(15), is refracted at the surface 15a, permeates the inside of the sub-wavelength concavo-convex structure 15c, is reflected by the boundary surface between the reflecting film 15d and the sub-wavelength concavo-convex structure 15c, permeates the inside of the sub-wavelength concavo-convex structure 15c, is refracted at the surface 15a, and is emitted as emitted light LO. The emitted light LO and the incident light LI form an angle of 90 degrees.

Similarly, the enlarged view of the sub-wavelength concavo-convex structure 15c formed in the reflecting wavelength plate 25(15) is the same as that described in the first embodiment and can be expressed with reference to FIG. 4. Here, the sub-wavelength concavo-convex structure has a pitch P smaller than the wavelength of incident light. It is known that the pitch structure having the pitch P smaller than the wavelength of incident light does not diffract the incident light (i.e., the incident light directly permeates the pitch structure) and indicates a birefringence characteristic with respect to the incident light. In other words, the pitch structure indicates different refractive indexes in accordance with the polarization direction of the incident light. As a result, since a phase difference can be arbitrarily set in such a manner that parameters related to the structure are adjusted, various wavelength plates can be realized.

Note that the pitch P must be smaller than a wavelength of 405 nm for a BD as the shortest wavelength of incident light and more preferably half or less of a wavelength of 405 nm.

Figure 8:
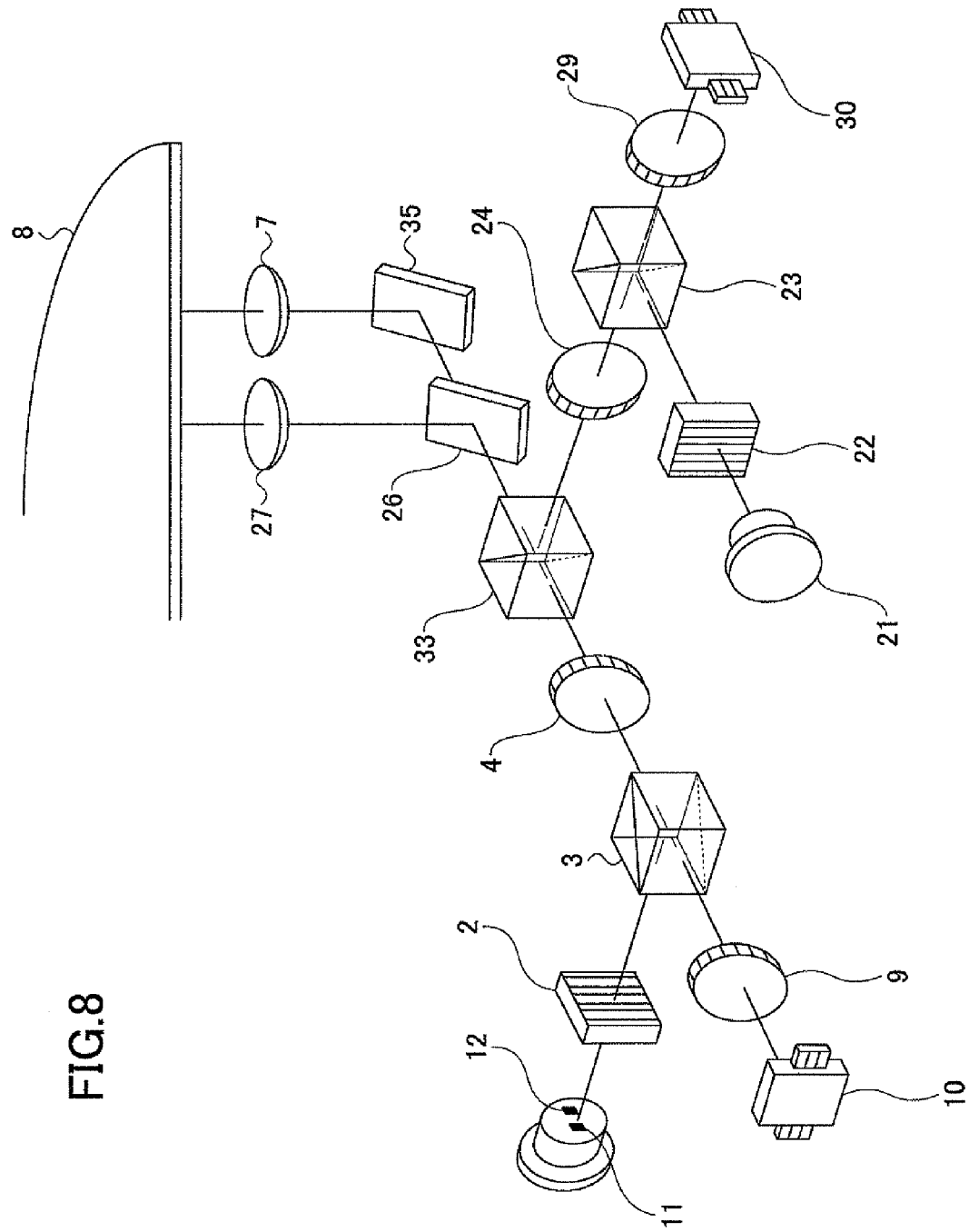
FIG. 8 is a view showing the schematic configuration of the optical pickup according to a third embodiment of the present invention.

FIG. 8 is a view showing the schematic configuration of the optical pickup according to a third embodiment of the present invention. Here in this embodiment, components having the same functions as those described with reference to FIG. 6 are denoted by the same reference numerals.

Furthermore, the configuration of the optical pickup having the light source of the three wavelengths is not limited to that of the optical pickup according to the second embodiment described above. As shown in FIG. 8, the reflecting (¼) wavelength plate 26 that reflects light having a wavelength of 405 nm of a semiconductor laser (for a BD) 21 may be arranged on the side closer to the light source than the reflecting wavelength plate 35 that reflects light having a wavelength of 660 nm of a semiconductor laser (for a DVD) 11 and light having a wavelength of 785 nm of a semiconductor laser (for a CD) 12. In this case, the pitch of the reflecting wavelength plate 35 may be less than or equal to 660 nm, which makes manufacturing of the reflecting wavelength plate 35 easier than that of the reflecting manufacturing plate 25 according to the second embodiment. As a result, yield improvements and reduced manufacturing costs are made possible.

Figure 9A:
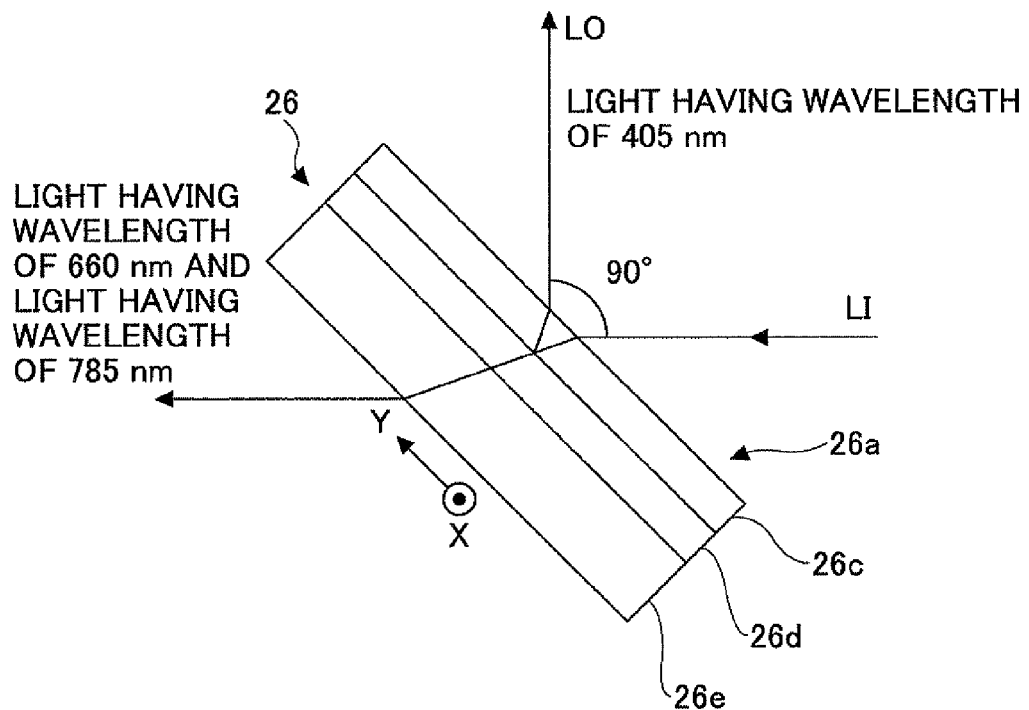
FIGS. 9A and 9B are a cross-sectional view and a perspective view showing the macrostructure of a reflecting wavelength plate according to the third embodiment, respectively.
Figure 9B:
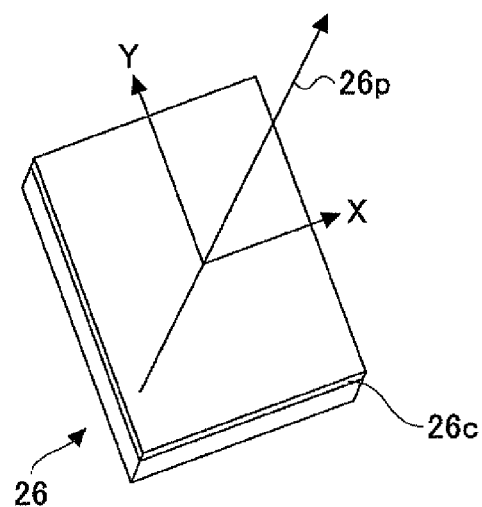

FIG. 9A is a cross-sectional view showing the macrostructure of the reflecting (¼) wavelength plate according to the third embodiment, and FIG. 9B is a perspective view of the reflecting (¼) wavelength plate. As shown in FIG. 9A, the reflecting (¼) wavelength plate 26 has a reflecting film 26d and a sub-wavelength concavo-convex structure 26c having the function of the (¼) wavelength plate arranged in this order on a glass substrate 26e. The reflecting film 26d is a dichroic coat formed of a dielectric multilayer film that reflects light having a wavelength of 660 nm and light having a wavelength of 785 nm and allows permeation of light having a wavelength of 405 nm.

Furthermore, FIG. 9A shows a state in which light is refracted and reflected by the reflecting (¼) wavelength plate 26. The forward-traveling incident light LI from the light source is incident on the surface 26a of the reflecting (¼) wavelength plate 26, is refracted at the surface 26a, and permeates the inside of the sub-wavelength concavo-convex structure 26c. The light having a wavelength of 405 nm is reflected by the boundary surface between the reflecting film 26d and the sub-wavelength concavo-convex structure 26c, permeates the inside of the sub-wavelength concavo-convex structure 26c, is refracted at the surface 26a, and is emitted as emitted light LO. The emitted light LO and the incident light LI form an angle of 90 degrees. On the other hand, the light having a wavelength of 405 nm and the light having a wavelength of 785 nm directly permeate the sub-wavelength concavo-convex structure 26c, the reflecting film 26d, and the glass substrate 26e serving as the constituents of the reflecting (¼) wavelength plate 26.

Furthermore, as shown in FIG. 9B, the optical axis (f-axis) 26p of the reflecting (¼) wavelength plate 26 is set at an angle of 45 degrees relative to an x-direction and a y-direction. Therefore, linear polarized light having a wavelength of 405 nm in the x-direction is converted into circular polarized light.

The enlarged view of the sub-wavelength concavo-convex structure 26c formed in the reflecting (¼) wavelength plate 26 is the same as that described in the first embodiment and can be expressed with reference to FIG. 4. Here, the sub-wavelength concavo-convex structure has a pitch P smaller than the wavelength of incident light. It is known that the pitch structure having the pitch P smaller than the wavelength of incident light does not diffract the incident light (i.e., the incident light directly permeates the pitch structure) and indicates a birefringence characteristic with respect to the incident light. In other words, the pitch structure indicates different refractive indexes in accordance with the polarization direction of the incident light. As a result, since a phase difference can be arbitrarily set in such a manner that parameters related to the structure are adjusted, various wavelength plates can be realized.

Note that the pitch P must be smaller than a wavelength of 405 nm for a BD as the shortest wavelength of incident light and more preferably half or less of a wavelength of 405 nm.

Furthermore, the macrostructure of the reflecting wavelength plate 35 according to the third embodiment is configured in the same manner as that of the reflecting (¼) wavelength plate shown in FIGS. 3A and 3B. However, the reflecting (¼) wavelength plate 26 also adds a phase difference to the light having a wavelength of 660 nm and the light having a wavelength of 785 nm (see FIG. 8). Therefore, the reflecting wavelength plate 35 must be configured to add a phase difference in consideration of the phase difference added by the reflecting (¼) wavelength plate 26. Accordingly, the reflecting wavelength plate 35 does not serve as the so-called ¼ wavelength plate.

As shown in FIG. 3A, the reflecting wavelength plate 35(15) according to the third embodiment has the reflecting film 15d and the sub-wavelength concavo-convex structure 15c having the function of the wavelength plate arranged in this order on the glass substrate 15e. Furthermore, FIG. 3A shows a state in which light is refracted and reflected by the reflecting wavelength plate 35(15). The forward-traveling incident light LI from the light source is incident on the surface 15a of the reflecting wavelength plate 35(15), is refracted at the surface 15a, permeates the inside of the sub-wavelength concavo-convex structure 15c, is reflected by the boundary surface between the reflecting film 15d and the sub-wavelength concavo-convex structure 15c, permeates the inside of the sub-wavelength concavo-convex structure 15c, is refracted at the surface 15a, and is emitted as emitted light LO. The emitted light LO and the incident light LI form an angle of 90 degrees.

Similarly, the enlarged view of the sub-wavelength concavo-convex structure 15c formed in the reflecting wavelength plate 35(15) is the same as that described in the first embodiment and can be expressed with reference to FIG. 4. Here, the sub-wavelength concavo-convex structure has a pitch P smaller than the wavelength of incident light. It is known that the pitch structure having the pitch P smaller than the wavelength of incident light does not diffract the incident light (i.e., the incident light directly permeates the pitch structure) and indicates a birefringence characteristic with respect to the incident light. In other words, the pitch structure indicates different refractive indexes in accordance with the polarization direction of the incident light. As a result, since a phase difference can be arbitrarily set in such a manner that parameters related to the structure are adjusted, various wavelength plates can be realized.

Note that the pitch P must be smaller than a wavelength of 660 nm for a DVD as the shortest wavelength of incident light and more preferably half or less of a wavelength of 660 nm.

Figure 10:
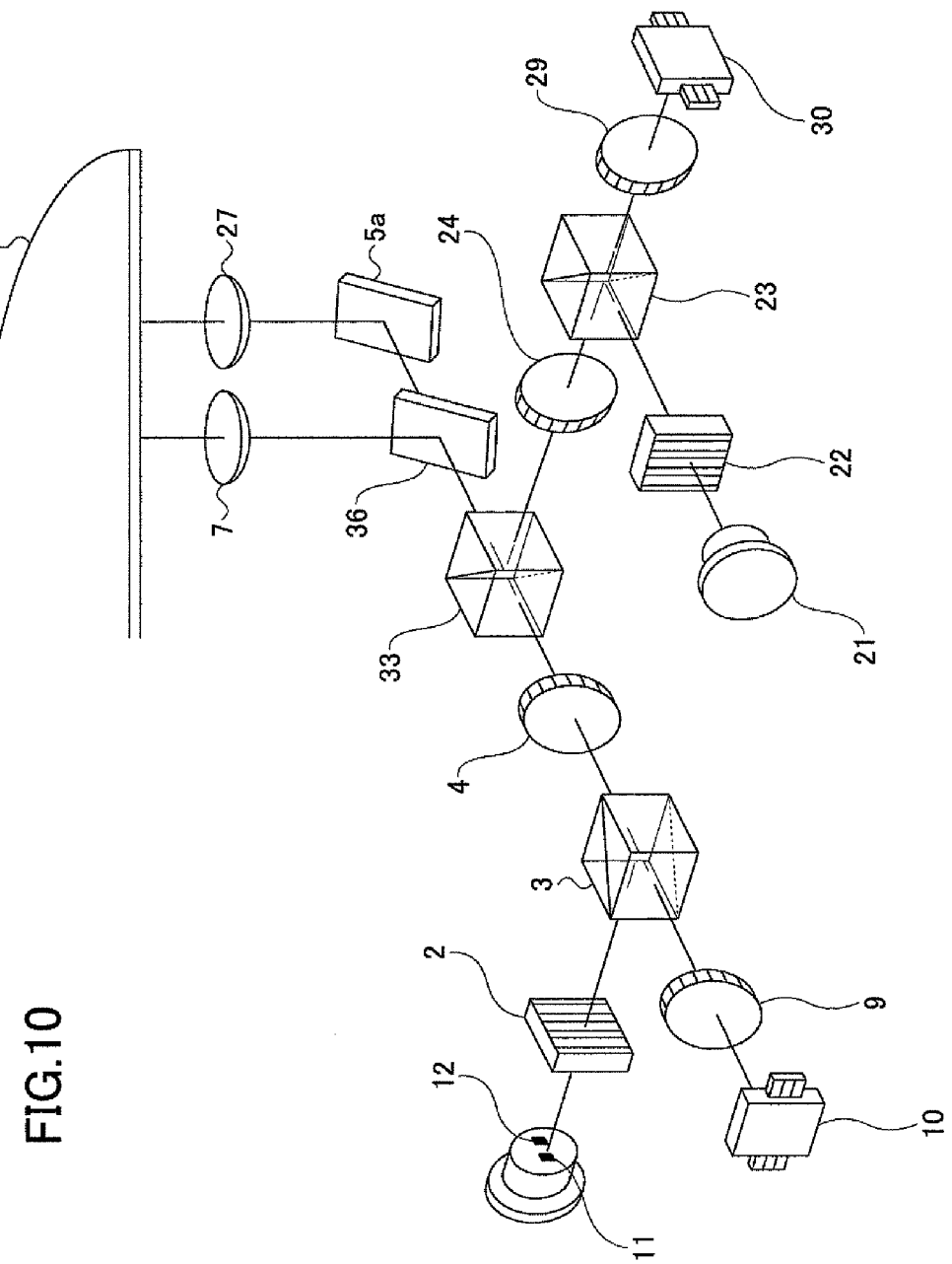
FIG. 10 is a view showing the schematic configuration of the optical pickup according to a fourth embodiment of the present invention.

FIG. 10 is a view showing the schematic configuration of the optical pickup according to a fourth embodiment of the present invention. Here in this embodiment, components having the same functions as those described with reference to FIG. 6 are denoted by the same reference numerals.

Furthermore, the configuration of the optical pickup having the light source of the three wavelengths is not limited to those of the optical pickups according to the second and third embodiments described above. As shown in FIG. 10, the reflecting wavelength plate 36 may serve as a reflecting (¼) wavelength plate that reflects light having a wavelength of 660 nm of a semiconductor laser (for a DVD) 11 and light having a wavelength of 785 nm of a semiconductor laser (for a CD) and serve as a transmission (¼) wavelength plate that allows permeation of light having a wavelength of 405 nm of the semiconductor laser (for BD). In this case, a reflecting mirror 5a that performs only reflection and deflection is required instead of the reflecting wavelength plate 25, and only one component may have the function of the wavelength plate for the three wavelengths. Therefore, the installation accuracy of the components such as the directional accuracy of the optical axis can be managed at one component. As a result, yield improvements and reduced manufacturing costs are made possible.

Figure 11A:
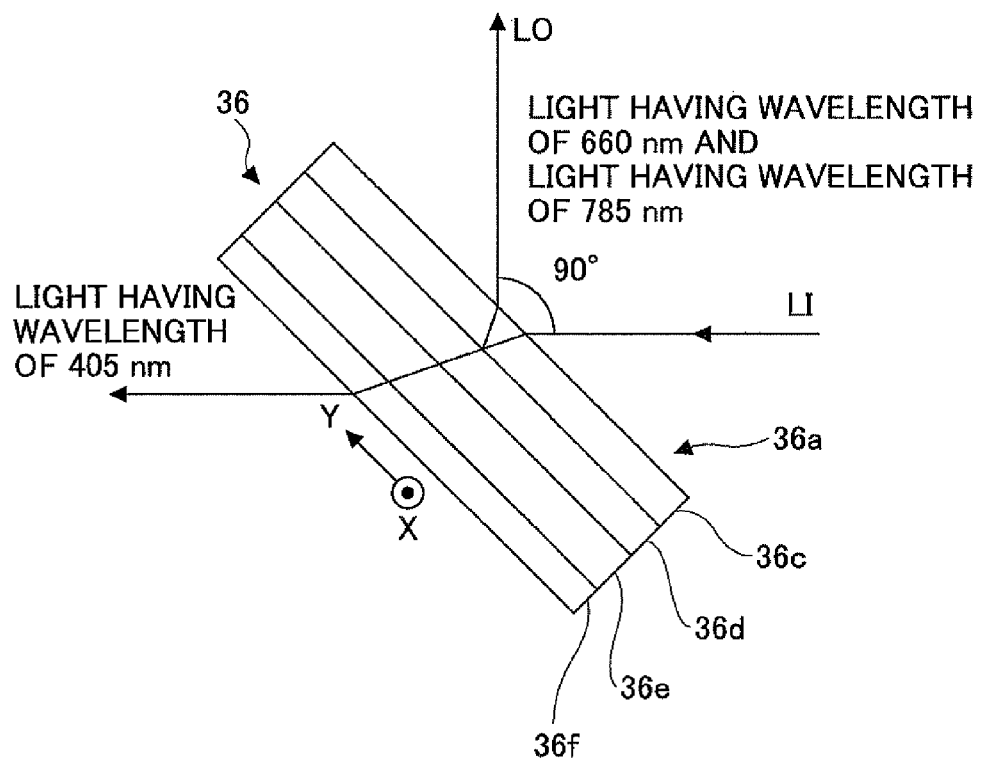
FIGS. 11A and 11B are a cross-sectional view and a perspective view showing the macrostructure of a reflecting wavelength plate according to the fourth embodiment, respectively.

FIG. 11A is a cross-sectional view showing the macrostructure of the reflecting (¼) wavelength plate according to the fourth embodiment, and FIG. 9B is a perspective view of the reflecting (¼) wavelength plate. As shown in FIG. 11A, the reflecting (¼) wavelength plate 36 has a reflecting film 36d and a sub-wavelength concavo-convex structure 36c having the function of the (¼) wavelength plate arranged in this order on a glass substrate 36e. In addition, the reflecting (¼) wavelength plate 36 has a sub-wavelength concavo-convex structure 36f that adds a predetermined phase difference through the glass substrate 36e. The reflecting film 36d is a dichroic coat formed of a dielectric multilayer film that reflects light having a wavelength of 660 nm and light having a wavelength of 785 nm and allows permeation of light having a wavelength of 405 nm.

Figure 11B:
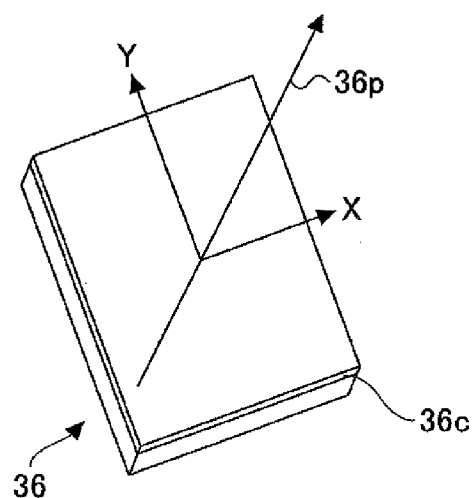

Furthermore, as shown in FIG. 11B, the optical axis (f-axis) 36p of the reflecting (¼) wavelength plate 36 is set at an angle of 45 degrees relative to an x-direction and a y-direction.

Furthermore, FIG. 11A shows a state in which light is refracted and reflected by the reflecting (¼) wavelength plate 36. The forward-traveling incident light LI from the light source is incident on the surface 36a of the reflecting (¼) wavelength plate 36, is refracted at the surface 36a, and permeates the inside of the sub-wavelength concavo-convex structure 36c. The light having a wavelength of 660 nm and the light having a wavelength of 785 nm are reflected by the boundary surface between the reflecting film 36d and the sub-wavelength concavo-convex structure 36c, permeates the inside of the sub-wavelength concavo-convex structure 36c, is refracted at the surface 36a, and is emitted as emitted light LO. The emitted light LO and the incident light LI form an angle of 90 degrees. On the other hand, the light having a wavelength of 405 nm permeates the sub-wavelength concavo-convex structure 36c, the reflecting film 36d, the glass substrate 36e, and the sub-wavelength concavo-convex structure 36f serving as the constituents of the reflecting (¼) wavelength plate 36.

The enlarged view of the sub-wavelength concavo-convex structure 36c formed in the reflecting (¼) wavelength plate 36 is the same as that described in the first embodiment and can be expressed with reference to FIG. 4. Here, the sub-wavelength concavo-convex structure has a pitch P smaller than the wavelength of incident light. It is known that the pitch structure having the pitch P smaller than the wavelength of incident light does not diffract the incident light (i.e., the incident light directly permeates the pitch structure) and indicates a birefringence characteristic with respect to the incident light. In other words, the pitch structure indicates different refractive indexes in accordance with the polarization direction of the incident light. As a result, since a phase difference can be arbitrarily set in such a manner that parameters related to the structure are adjusted, various wavelength plates can be realized.

Note that the pitch P must be smaller than a wavelength of 405 nm for a BD as the shortest wavelength of incident light and more preferably half or less of a wavelength of 405 nm.

Here, a description is made of the sub-wavelength concavo-convex structure 36f formed at the surface on the side opposite to the light source of the reflecting wavelength plate 36 according to the fourth embodiment. A phase difference is added to the light having a wavelength of 405 nm at the sub-wavelength concavo-convex structure 36c and the sub-wavelength concavo-convex structure 36f. Then, the light having a wavelength of 405 nm is converted into circular polarized light at the time of permeating the reflecting (¼) wavelength plate 36. In other words, the sub-wavelength concavo-convex structure 36c is configured to have the function of the reflecting (¼) wavelength plate with respect to the light having a wavelength of 660 nm and the light having a wavelength of 785. Meanwhile, the sub-wavelength concavo-convex structure 36f further adjusts the phase difference added when the light having a wavelength of 405 nm passes through the sub-wavelength concavo-convex structure 36c so as to convert the light having a wavelength of 405 nm into the circular polarized light.

Figure 12:
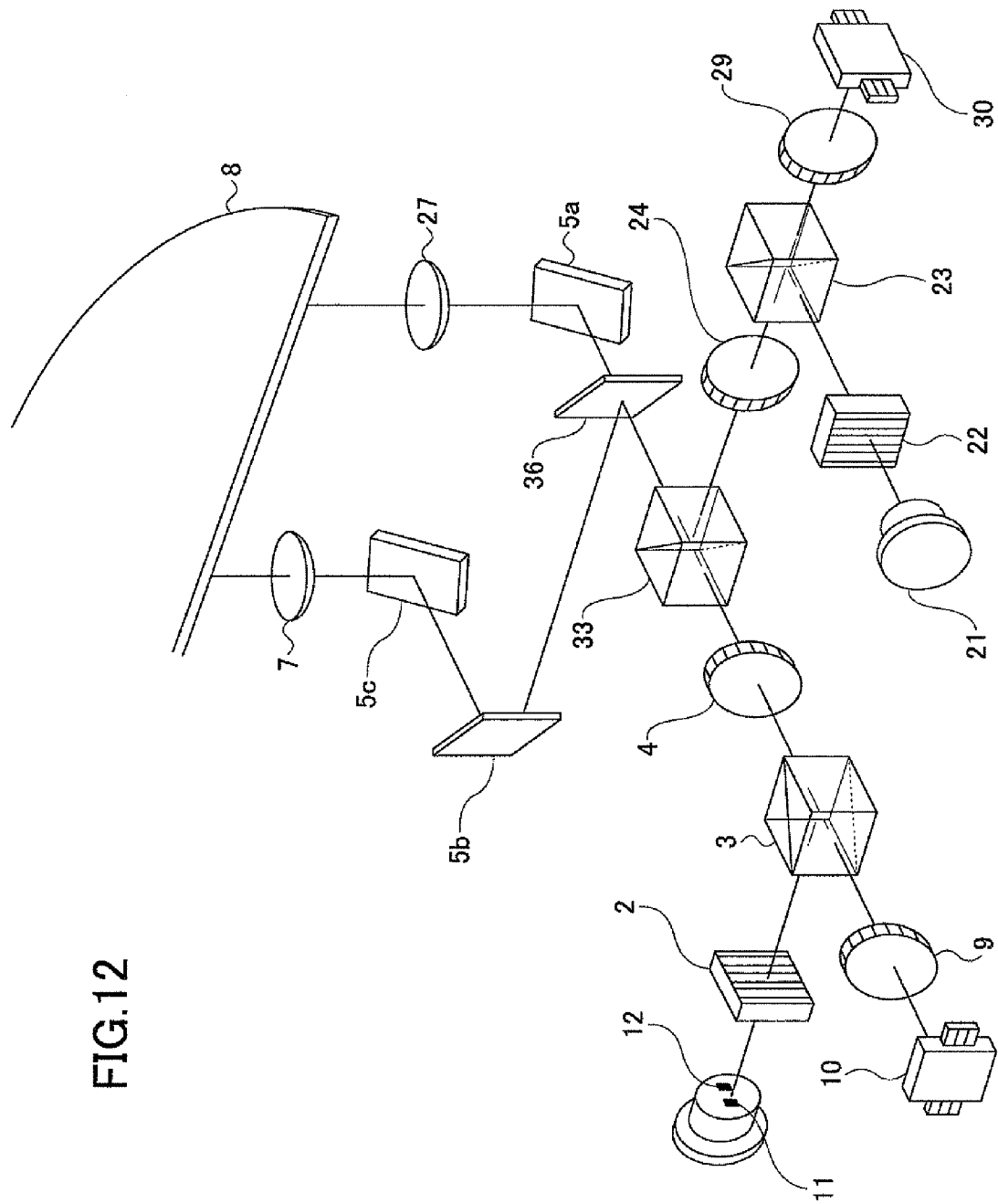
FIG. 12 is a view showing another schematic configuration of the optical pickup according to the fourth embodiment.

FIG. 12 is a view showing another schematic configuration of the optical pickup according to the fourth embodiment of the present invention. The deflection of the reflecting (¼) wavelength plate 36 is not limited to the deflection of the light from the light source into the optical recording medium 8. That is, the reflecting (¼) wavelength plate 36 may deflect the light inside the optical system where the light source and the light receiving elements are arranged. In this case, the optical system can be freely arranged through the reflecting mirror 5b and 5c serving as units for deflecting the light into the optical recording medium 8.

Figure 13:
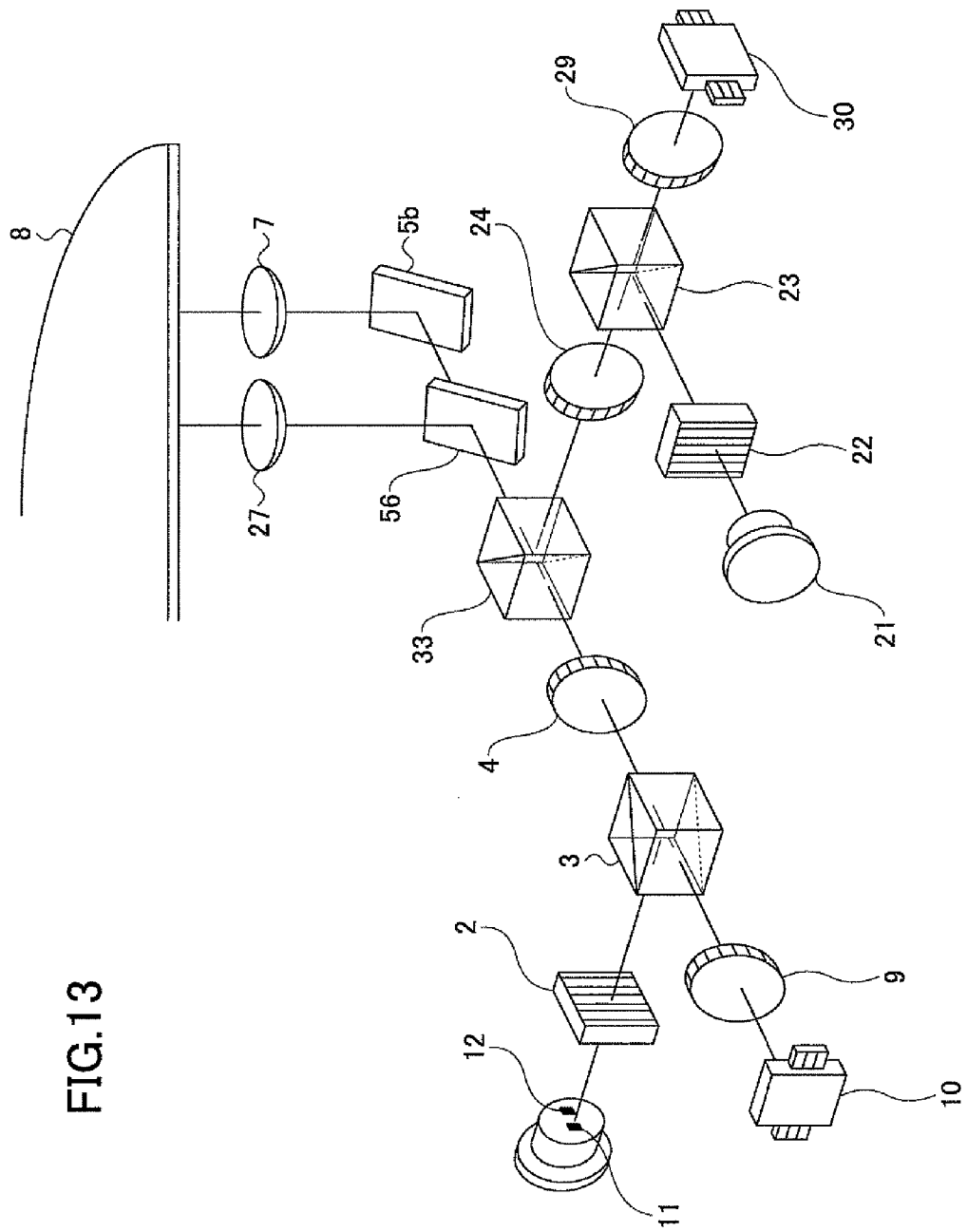
FIG. 13 is a view showing the schematic configuration of the optical pickup according to a fifth embodiment of the present invention.

FIG. 13 is a view showing the schematic configuration of the optical pickup according to a fifth embodiment of the present invention. Here in this embodiment, components having the same functions as those described with reference to FIG. 8 are denoted by the same reference numerals.

Furthermore, the configuration of the optical pickup having the light source of the three wavelengths is not limited to those of the optical pickups according to the second, third, and fourth embodiments described above. As shown in FIG. 13, the reflecting wavelength plate 56 may serve as the reflecting (¼) wavelength plate that reflects light having a wavelength of 405 nm of a semiconductor laser (for a DVD) 21 and serve as a transmission (¼) wavelength plate that allows permeation of light having a wavelength of 660 nm of the semiconductor laser (for a BD) 11 and light having a wavelength of 785 nm of the semiconductor laser (for a CD) 12. In this case, the pitch of the sub-wavelength concavo-convex structure formed at the surface on the side opposite to the light source of the reflecting (¼) wavelength plate 56 may be less than or equal to 660 nm, which makes manufacturing of the reflecting wavelength plate 56 easier than that of the reflecting manufacturing plate 46 according to the fourth embodiment. As a result, yield improvements and reduced manufacturing costs are made possible.

Figure 14A:
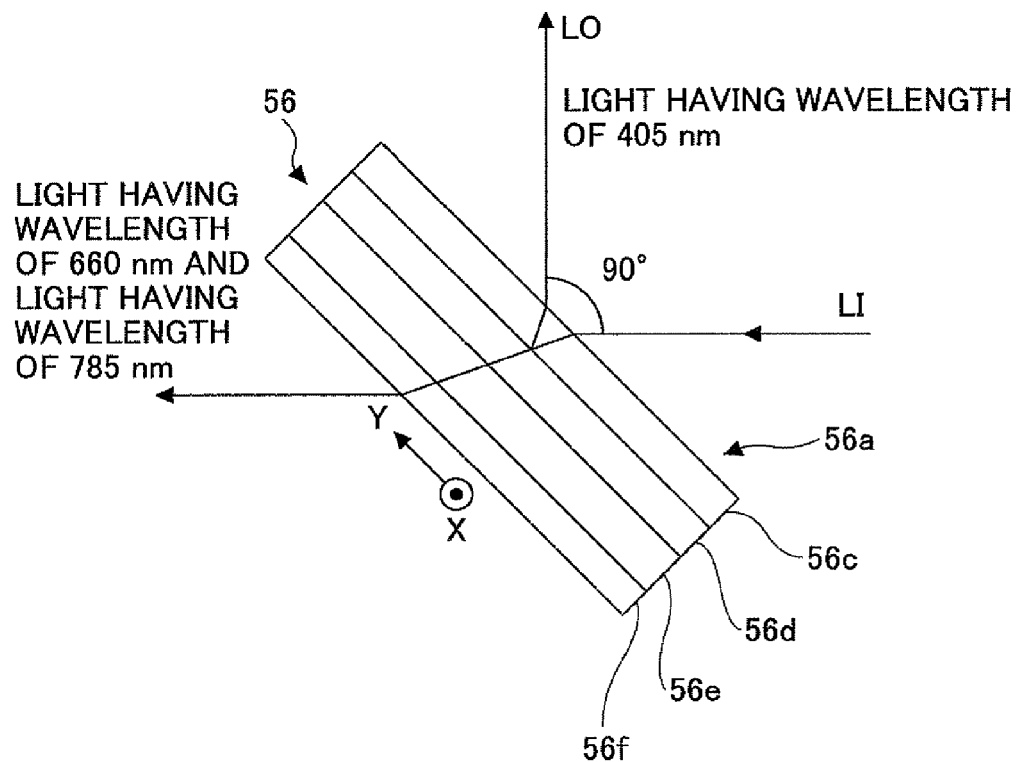
FIGS. 14A and 14B are a cross-sectional view and a perspective view showing the macrostructure of a reflecting wavelength plate according to the fifth embodiment, respectively.
Figure 14B:
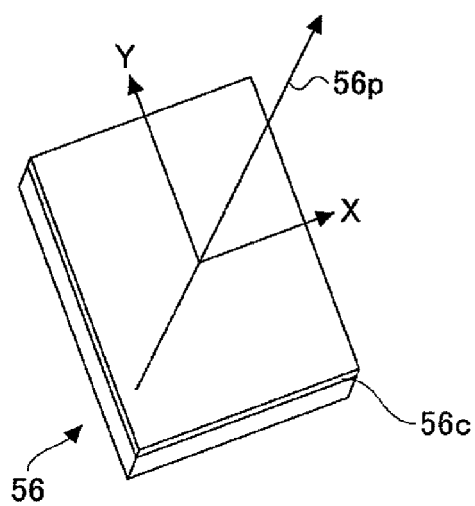

FIG. 14A is a cross-sectional view showing the macrostructure of the reflecting (¼) wavelength plate according to the fifth embodiment, and FIG. 14B is a perspective view of the reflecting (¼) wavelength plate. As shown in FIG. 14A, the reflecting (¼) wavelength plate 56 has a reflecting film 56d and a sub-wavelength concavo-convex structure 56c having the function of the (¼) wavelength plate arranged in this order on a glass substrate 56e. In addition, the reflecting (¼) wavelength plate 56 has a sub-wavelength concavo-convex structure 56f that adds a predetermined phase difference through the glass substrate 56e. The reflecting film 56d is a dichroic coat formed of a dielectric multilayer film that reflects light having a wavelength of 405 nm and allows permeation of light having a wavelength of 660 nm and light having a wavelength of 785 nm.

Furthermore, as shown in FIG. 14B, the optical axis (f-axis) 56p of the reflecting (¼) wavelength plate 56 is set at an angle of 45 degrees relative to an x-direction and a y-direction.

Furthermore, FIG. 14A shows a state in which light is refracted and reflected by the reflecting (¼) wavelength plate 56. The forward-traveling incident light LI from the light source is incident on the surface 56a of the reflecting (¼) wavelength plate 56, is refracted at the surface 56a, and permeates the inside of the sub-wavelength concavo-convex structure 56c. The light having a wavelength of 405 nm is reflected by the boundary surface between the reflecting film 56d and the sub-wavelength concavo-convex structure 56c, permeates the inside of the sub-wavelength concavo-convex structure 56c, is refracted at the surface 56a, and is emitted as emitted light LO. The emitted light LO and the incident light LI form an angle of 90 degrees. On the other hand, the light having a wavelength of 660 nm and the light having a wavelength of 785 nm permeate the sub-wavelength concavo-convex structure 56c, the reflecting film 56d, the glass substrate 56e, and the sub-wavelength concavo-convex structure 56f serving as the constituents of the reflecting (¼) wavelength plate 56.

The enlarged view of the sub-wavelength concavo-convex structure 56c formed in the reflecting (¼) wavelength plate 56 is the same as that described in the first embodiment and can be expressed with reference to FIG. 4. Here, the sub-wavelength concavo-convex structure has a pitch P smaller than the wavelength of incident light. It is known that the pitch structure having the pitch P smaller than the wavelength of incident light does not diffract the incident light (i.e., the incident light directly permeates the pitch structure) and indicates a birefringence characteristic with respect to the incident light. In other words, the pitch structure indicates different refractive indexes in accordance with the polarization direction of the incident light. As a result, since a phase difference can be arbitrarily set in such a manner that parameters related to the structure are adjusted, various wavelength plates can be realized.

Note that the pitch P of the sub-wavelength concavo-convex structure 56c must be smaller than a wavelength of 405 nm for a BD as the shortest wavelength of incident light and more preferably half or less of a wavelength of 405 nm. On the other hand, the pitch P of the sub-wavelength concavo-convex structure 56f may be smaller than a wavelength of 660 nm for a DVD and more preferably half or less of a wavelength of 660 nm.

Here, a description is made of the sub-wavelength concavo-convex structure 56f formed at the surface on the side opposite to the light source of the reflecting wavelength plate 56 according to the fifth embodiment. A phase difference is added to the light having a wavelength of 660 nm and the light having a wavelength of 785 nm at the sub-wavelength concavo-convex structure 56c and the sub-wavelength concavo-convex structure 56f. Then, the light having a wavelength of 660 nm and the light having a wavelength of 785 nm are converted into circular polarized light at the time of permeating the reflecting (¼) wavelength plate 56. In other words, the sub-wavelength concavo-convex structure 56c is configured to have the function of the reflecting (¼) wavelength plate with respect to the light having a wavelength of 405 nm. Meanwhile, the sub-wavelength concavo-convex structure 56f further adjusts the phase difference added when the light having a wavelength of 660 nm and the light having a wavelength of 785 nm pass through the sub-wavelength concavo-convex structure 56c so as to convert the light having a wavelength of 660 nm and the light having a wavelength of 785 nm into the circular polarized light.

Figure 15:
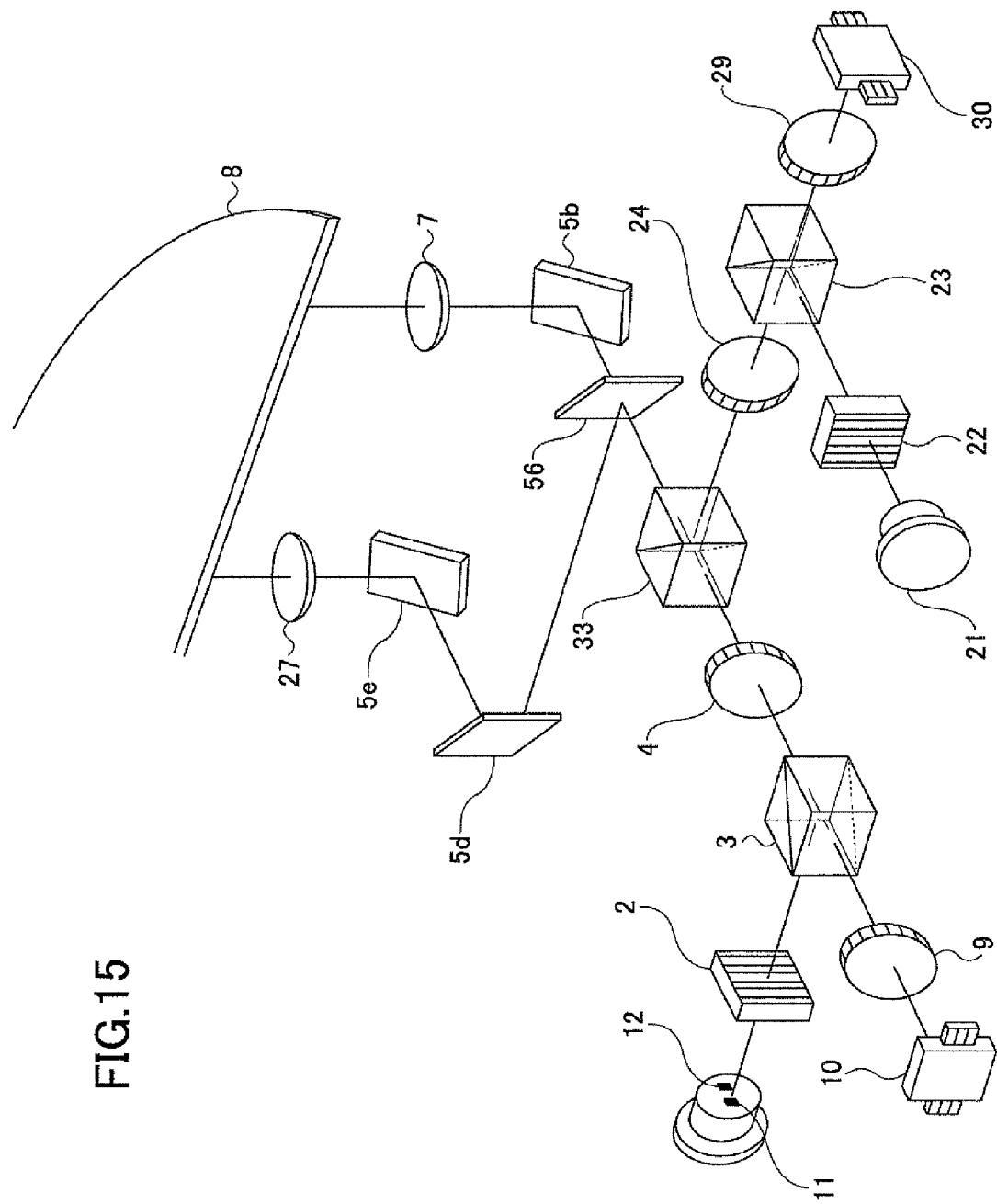
FIG. 15 is a view showing another schematic configuration of the optical pickup according to the fifth embodiment.

FIG. 15 is a view showing another schematic configuration of the optical pickup according to the fourth embodiment of the present invention. The deflection of the reflecting (¼) wavelength plate 56 is not limited to the deflection of the light from the light source into the optical recording medium 8. That is, the reflecting (¼) wavelength plate 56 may deflect the light inside the optical system where the light source and the light receiving elements are arranged. In this case, the optical system can be freely arranged through the reflecting mirror 5d and 5e serving as units for deflecting the light into the optical recording medium 8.

Figure 16:
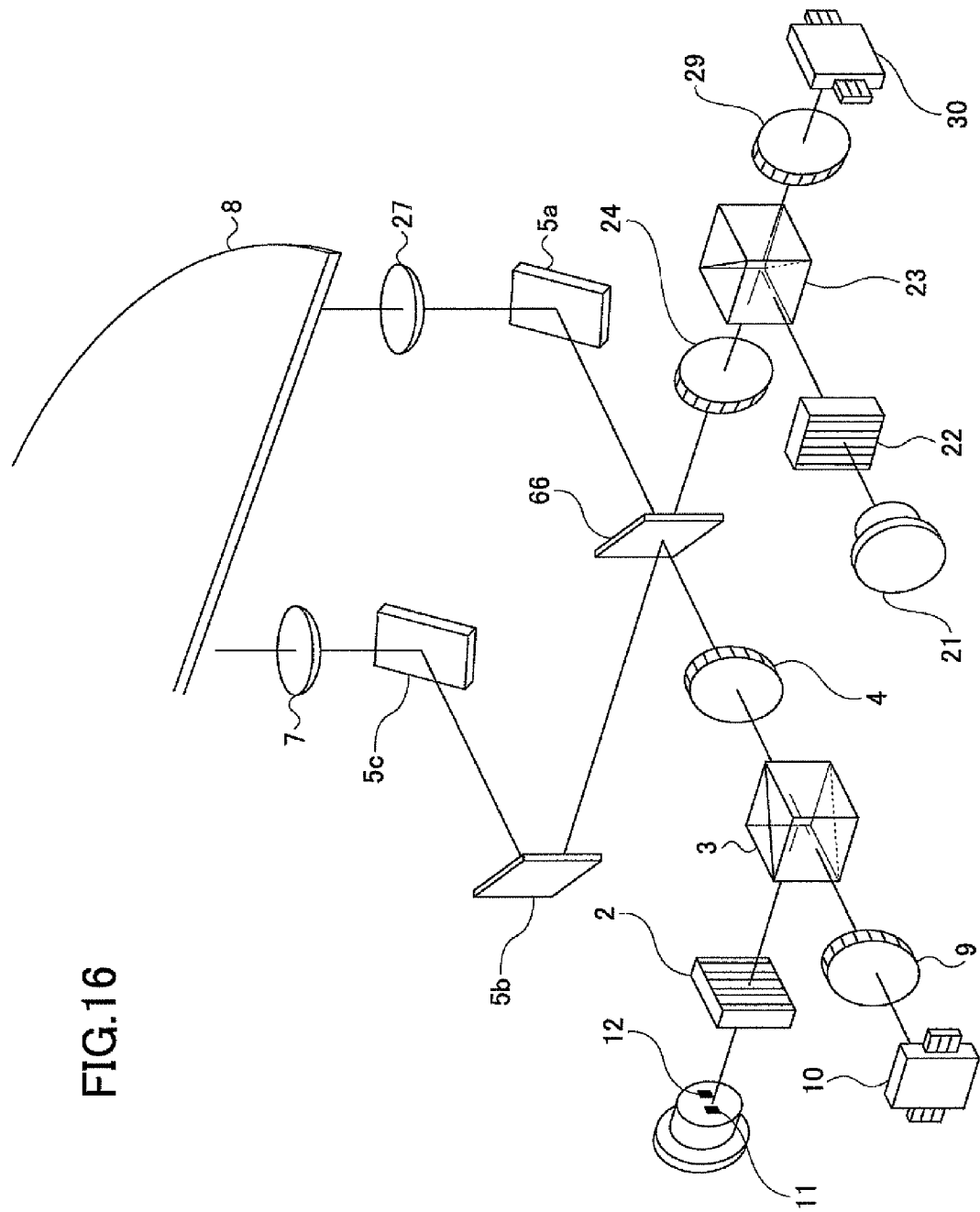
FIG. 16 is a view showing the schematic configuration of the optical pickup according to a sixth embodiment of the present invention.
Figure 17:
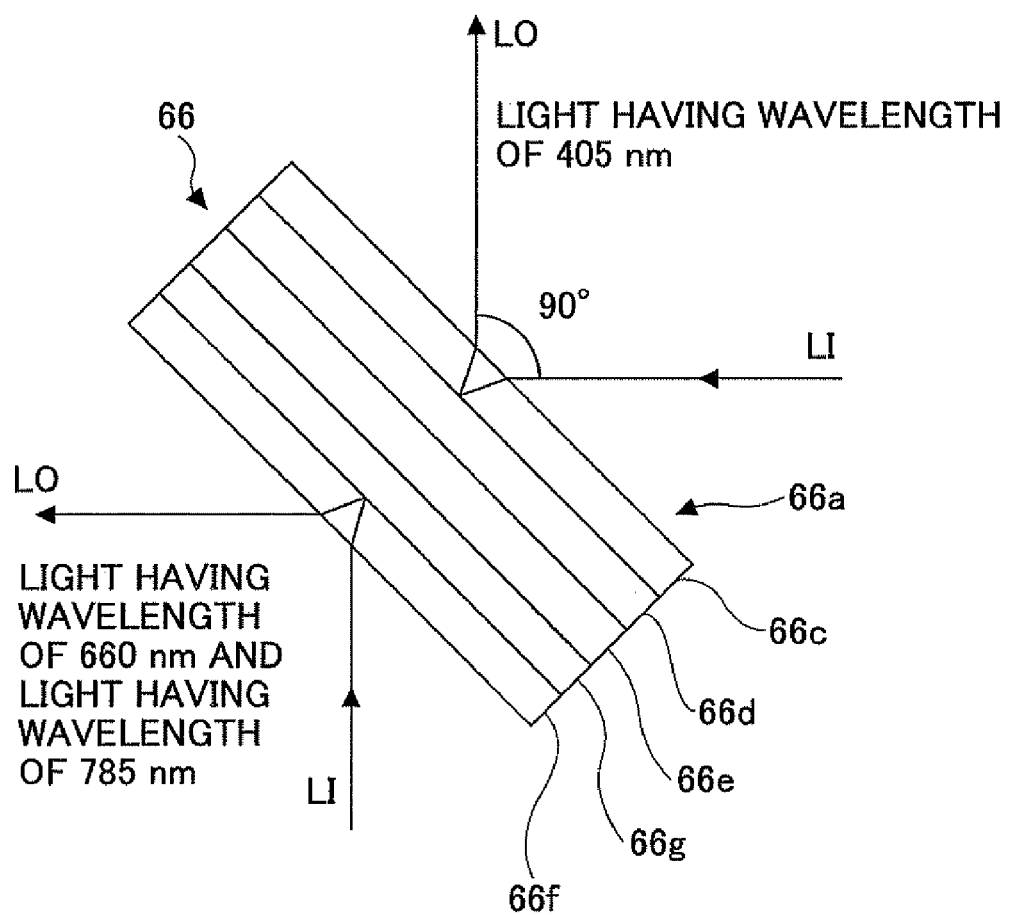
FIG. 17 is a cross-sectional view showing the macrostructure of a reflecting wavelength plate according to the sixth embodiment.

FIG. 16 is a view showing the schematic configuration of the optical pickup according to a sixth embodiment of the present invention. As shown in FIG. 17, a reflecting (¼) wavelength plate 66 may have the function of a reflecting (¼) wavelength plate for a wavelength of 405 nm and the function of a reflecting (¼) wavelength plate for a wavelength of 660 nm and a wavelength of 785 nm at its both surfaces through a glass substrate 66e. The function of the reflecting (¼) wavelength plate for a wavelength of 405 nm and the function of the reflecting (¼) wavelength plate for a wavelength of 660 nm and a wavelength of 785 nm may be the same as those used in the first embodiment.

Next, a description is specifically made of the reflecting (¼) wavelength plate provided in the optical pickup according to the first embodiment of the present invention.

The reflecting (¼) wavelength plate 15 having the macro-structure shown in FIGS. 3A and 3B has the reflecting film 15d and the sub-wavelength concavo-convex structure 15c having the function of the (¼) wavelength plate arranged in this order on the glass substrate 15e. FIG. 3A shows a state in which light is refracted and reflected by the reflecting (¼) wavelength plate 15. The forward-traveling incident light LI from the light source is incident on the surface 15a of the reflecting (¼) wavelength plate 15, is refracted at the surface 15a, permeates the inside of the sub-wavelength concavo-convex structure 15c, is reflected by the boundary surface between the reflecting film 15d and the sub-wavelength concavo-convex structure 15c, permeates the inside of the sub-wavelength concavo-convex structure 15c, refracted at the surface 15a, and is emitted as emitted light LO. The emitted light LO and the incident light LI form an angle of 90 degrees.

Furthermore, as shown in FIG. 3B, the optical axis (f-axis) 15p of the reflecting (¼) wavelength plate 15 is set at an angle of 45 degrees relative to the x-direction and the y-direction. Therefore, linear polarized light in the x-direction is converted into circular polarized light.

As seen in the enlarged view of the sub-wavelength concavo-convex structure 15c formed in the reflecting (¼) wavelength plate 15 shown in FIG. 4, a pitch P smaller than the wavelength of incident light is formed. The pitch structure having the pitch P smaller than the wavelength of incident light does not diffract the incident light (i.e., the incident light directly permeates the pitch structure) and indicates a birefringence characteristic with respect to the incident light. In other words, the pitch structure indicates different refractive indexes in accordance with the polarization direction of the incident light. As a result, since a phase difference can be arbitrarily set in such a manner that parameters related to the structure are adjusted, various wavelength plates can be realized.

Figure 18:
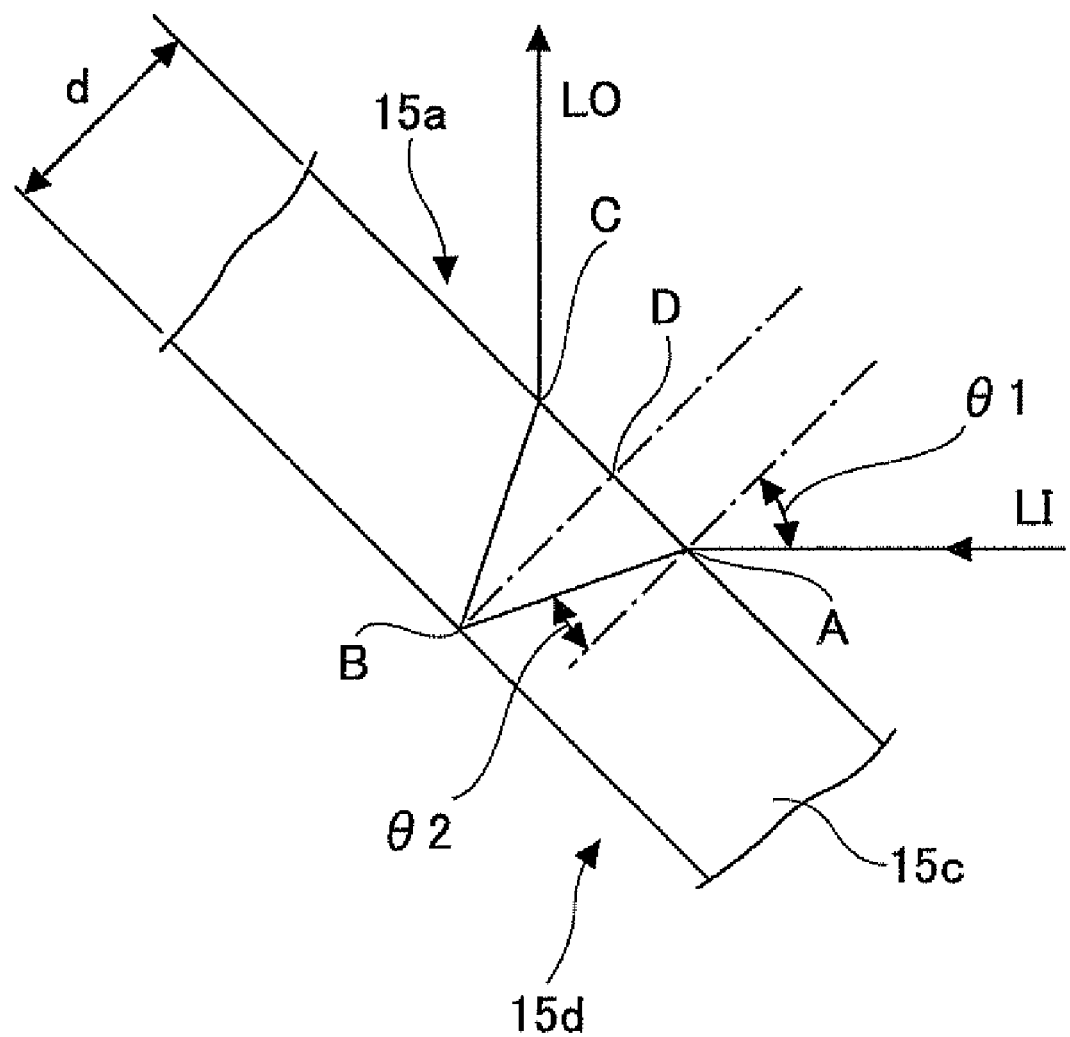
FIG. 18 is a diagram for explaining the phase difference of the reflecting wavelength plate.

Next, a required phase difference is studied with reference to Patent Document 1 as a related example. As shown in FIG. 18, when the incident point of the incident light LI at the surface 15a of the reflecting (¼) wavelength plate 15 is defined as A, the reflecting point at the boundary surface between the reflecting film 15b and the sub-wavelength concavo-convex structure 15c is defined as B, and the emitting point of the emitted light LO at the surface 15a is defined as C, the incident light LI is incident on the point A at an incident angle θ1 of 45 degrees and refracted.

When a refraction angle at this time is defined as θ2, the following relationship is established.

$$\sin(\theta 1) = No \times \sin(\theta 2) \quad \text{(Formula 1)}$$

Figure 19C:
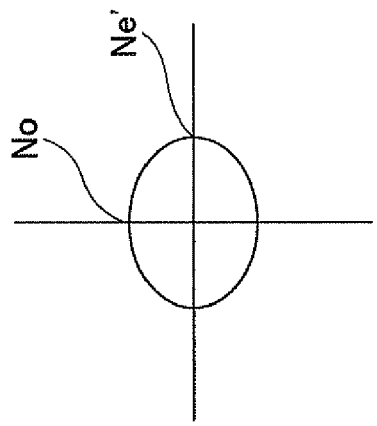
FIGS. 19B and 19C are diagrams for explaining a relationship between an ordinary-ray refractive index and extraordinary-ray refractive indexes Ne and Ne'.
Figure 19B:
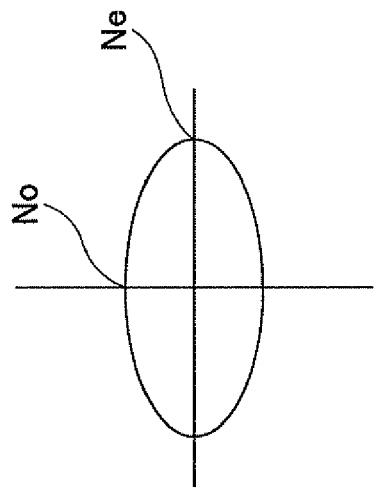
Figure 19A:
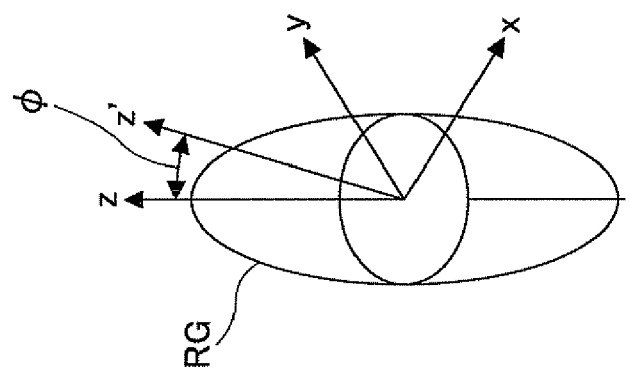
FIG. 19A is a diagram showing an index ellipsoid RG.

FIG. 19A shows an index ellipsoid RG. Let it be assumed that a crystal model formed by cutting a surface including a crystal axis z is used as the reflecting (¼) wavelength plate 15. In this case, when light is perpendicularly incident on the reflecting (¼) wavelength plate 15, an ordinary-ray refractive index is No and an extraordinary-ray refractive index is Ne as shown in FIG. 19B. Incidence of light on the reflecting (¼) wavelength plate 15 at an angle of θ as in the first embodiment is equivalent to a case where light is perpendicularly incident on the reflecting (¼) wavelength plate 15 formed by cutting the crystal axis z at an angle of θ.

In this case, as shown in FIG. 19C, the ordinary-ray refractive index is No and the extraordinary-ray refractive index is Ne'. Here, Ne is greater than Ne' (Ne'<Ne). Thus, when light is obliquely incident on the reflecting (¼) wavelength plate 15, it is turned in a direction which reduces the extraordinary-ray refractive index. In this case, since the refraction angle when the light is incident on the reflecting (¼) wavelength plate 15 is defined as θ2, the following relationship is established.

$$\left(\frac{1}{Ne'}\right)^2 = \left(\frac{\sin(\theta 2)}{No}\right)^2 + \left(\frac{\cos(\theta 2)}{Ne}\right)^2 \quad \text{(Formula 2)}$$

Furthermore, when the thickness of the sub-wavelength concavo-convex structure 15c is defined as d and a light-path length when light travels along a light path ABC (see FIG. 18) is defined as t, the phase difference Δ (θ2) of the reflecting (¼) wavelength plate 15 is expressed by the following formula.

$$\Delta(\theta 2) = \frac{2\pi \times (Ne' - No) \times t}{\lambda} \quad \text{(Formula 3)}$$

Here, between the thickness d and the light-path length t, the following relationship is established.

$$t = \frac{2d}{\cos(\theta 2)} \quad \text{(Formula 4)}$$

On the other hand, the phase difference Δ(0) when light is perpendicularly incident on the reflecting (¼) wavelength plate 15 is expressed by the following formula.

$$\Delta(0) = \frac{2\pi \times (Ne - No) \times d}{\lambda} \quad \text{(Formula 5)}$$

Accordingly, based on the above formulae 3 through 5, the following formula is obtained.

$$\Delta(0) = \frac{2 \times \Delta(\theta 2) \times (Ne - No)}{(Ne' - No)\cos(\theta 2)} \quad \text{(Formula 6)}$$

Here, a description is made of symbols shown in the enlarged view of the lattices of the sub-wavelength concavo-convex structure 15c formed in the reflecting (¼) wavelength plate 15 shown in FIG. 4. P indicates the concavo-convex pitch of the sub-wavelength concavo-convex structure, a indicates the land width of a convex part of the sub-wavelength concavo-convex structure, and d indicates the groove depth of the sub-wavelength concavo-convex structure. Furthermore, a/P is called a filling factor, which is used for calculating an effective refractive index described below.

The sub-wavelength concavo-convex structure 15c shown in FIG. 4 expresses generally-known structural double refraction. The structural double refraction refers to a phenomenon in which, when two types of mediums having different refractive indexes are arranged in a stripe pattern at a pitch smaller than a wavelength of light, the refractive index (called an effective refractive index) is different between a polarization component (TE wave) parallel to the stripe pattern and a polarization component (TM wave) orthogonal to the stripe pattern, thus generating double refractive action.

Here, light having a wavelength twice or larger than the pitch of the sub-wavelength concavo-convex structure is perpendicularly incident when air and a medium having a refractive index of n are assumed as the two types of mediums having different refractive indexes. Based on whether the polarization direction of the incident light at this time is parallel to (TE direction) or orthogonal to (TM direction) the grooves of the sub-wavelength concavo-convex structure, the effective refractive index of the sub-wavelength concavo-convex structure is obtained by the following formulae 7 and 8.

$$n(TE) = \sqrt{F \times n^2 + (1-F)} \quad \text{(Formula 7)}$$

$$n(TM) = \sqrt{\left(\frac{F}{n^2}\right) + (1-F)} \quad \text{(Formula 8)}$$

The case when the polarization direction of the incident light is parallel to the grooves of the sub-wavelength concavo-convex structure is defined as n (TE), and the case when the polarization direction of the incident light is orthogonal to the grooves of the sub-wavelength concavo-convex structure is defined as n (TE). The symbol on the left side in the formula 7 indicates n (TE), and the symbol on the left side in the formula 8 indicates n (TM). Furthermore, the symbol F in the formulas 7 and 8 indicates the filling factor described above.

Figure 20:
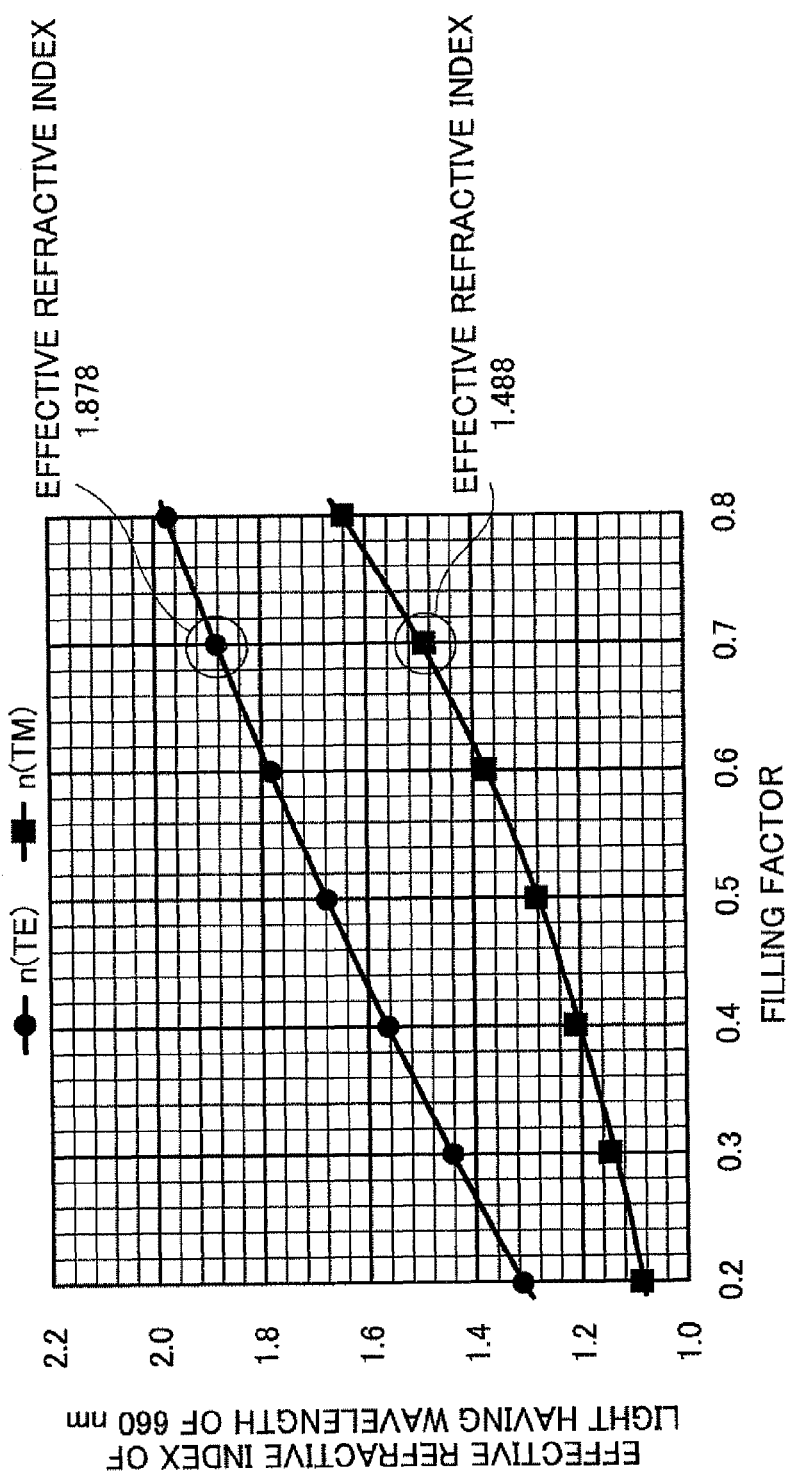
FIG. 20 is a graph showing refractive indexes corresponding to polarization directions with respect to filling factors of light having a wavelength of 660 nm.
Figure 21:
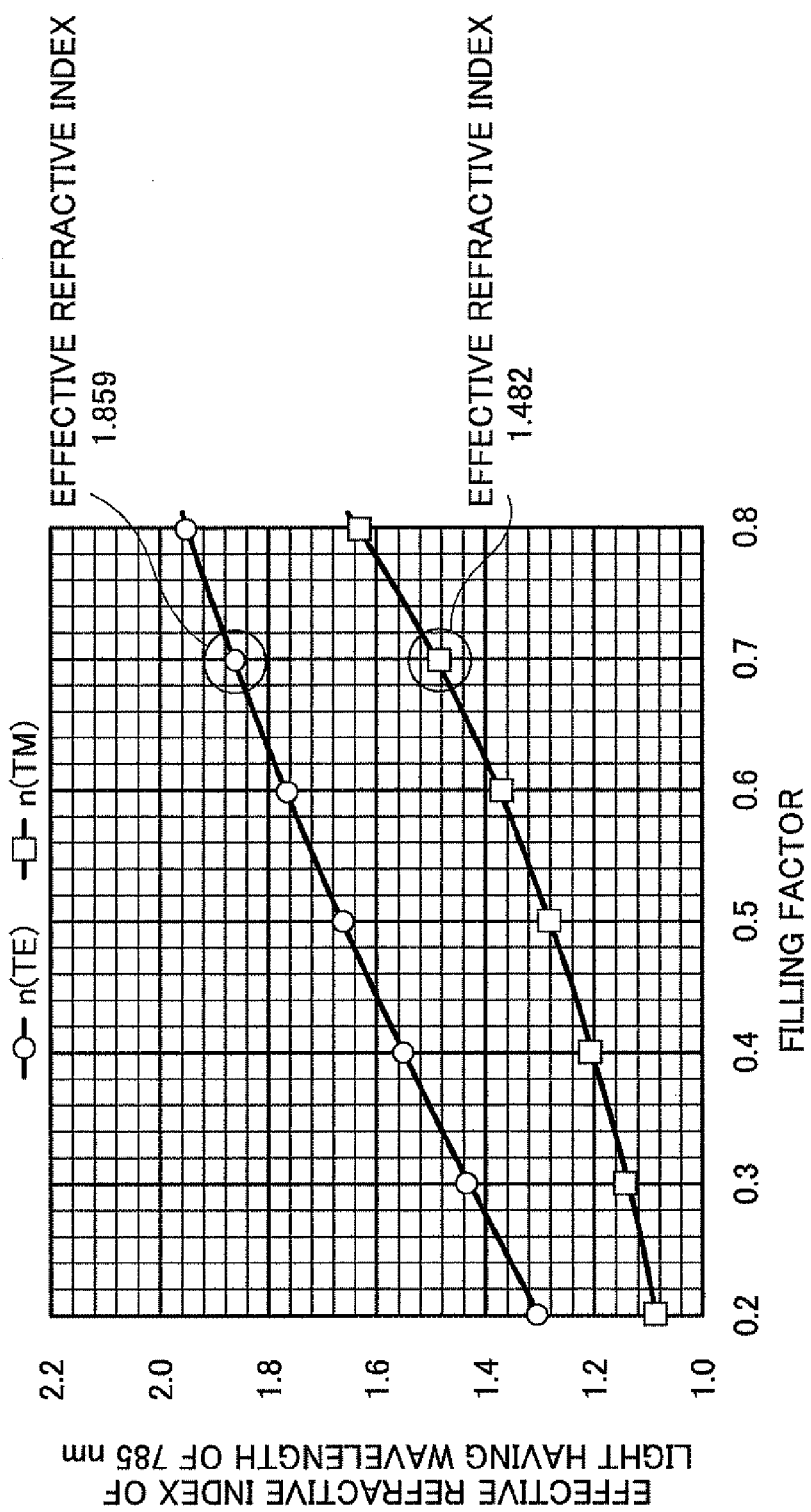
FIG. 21 is a graph showing refractive indexes corresponding to polarization directions with respect to filling factors of light having a wavelength of 785 nm.

FIG. 20 is a graph showing refractive indexes corresponding to polarization directions with respect to filling factors. FIG. 20 shows an example of calculation results of the respective refractive indexes. To calculate the refractive indexes, the refractive index n (DVD) (=2.147) of a wavelength of 660 nm of $Ta_2O_5$ (tantalum pentoxide) is used. Furthermore, FIG. 21 is a graph showing refractive indexes corresponding to polarization directions with respect to filling factors. FIG. 21 shows an example of calculation results of the respective refractive indexes. To calculate the refractive indexes, the refractive index n (CD) (=2.124) of a wavelength of 785 nm of $Ta_2O_5$ is used.

The filling factors F in FIG. 4 are obtained by the following formula.

$$F = \frac{a}{P} \quad \text{(Formula 9)}$$

Accordingly, the effective refractive indexes of the sub-wavelength concavo-convex structure are obtained as follows.

In the case of a DVD, the effective refractive index (n (TE, DVD)) in the TE direction of the sub-wavelength concavo-convex structure 1 is obtained by the following formula.

$$n(TE, DVD) = \sqrt{F1 \times (n(DVD))^2 + (1-F1)} \quad \text{(Formula 10)}$$

In the case of a DVD, the effective refractive index (n (TM, DVD)) in the TM direction of the sub-wavelength concavo-convex structure 1 is obtained by the following formula.

$$n(TM, DVD) = \sqrt{\frac{F1}{(n(DVD))^2} + (1-F1)} \quad \text{(Formula 11)}$$

In the case of a CD, the effective refractive index (n (TE, CD)) in the TE direction of the sub-wavelength concavo-convex structure 1 is obtained by the following formula.

$$n(TE, CD) = \sqrt{F1 \times (n(CD))^2 + (1-F1)} \quad \text{(Formula 12)}$$

In the case of a CD, the effective refractive index (n (TM, CD)) in the TM direction of the sub-wavelength concavo-convex structure 1 is obtained by the following formula.

$$n(TM, CD) = \sqrt{\frac{F1}{(n(CD))^2} + (1-F1)} \quad \text{(Formula 13)}$$

Furthermore, the phase difference of the sub-wavelength concavo-convex structure is obtained as follows.

In the case of a DVD, the phase difference Δ(DVD) of the sub-wavelength concavo-convex structure 15c when light is incident in the X-axis direction shown in FIG. 4 is obtained by the following formula.

$$\Delta(DVD) = \left| \left( \frac{2\pi}{660 \text{ nm}} \right) \times (n(TM, DVD) \times d - n(TE, DVD) \times d) \right| \quad \text{(Formula 14)}$$

In the case of a CD, the phase difference Δ(CD) of the sub-wavelength concavo-convex structure 15c when light is incident in the X-axis direction shown in FIG. 4 is obtained by the following formula.

$$\Delta(CD) = \left| \left( \frac{2\pi}{785 \text{ nm}} \right) \times (n(TM, CD) \times d - n(TE, CD) \times d) \right| \quad \text{(Formula 15)}$$

In the above formulae, d indicates the groove depth of the sub-wavelength concavo-convex structure 15c. When the filling factor and the groove depth d are appropriately selected, the phase difference can be arbitrarily adjusted.

An example of specific numerical values is described below. First, the pitch P of the sub-wavelength concavo-convex structure 15*c* is substantially smaller than a used wavelength. The pitch P is smaller than a wavelength of 660 nm of the light source for a DVD on a short wavelength side and desirably less than or equal to a half-wave length of 330 nm.

When the filling factor of the sub-wavelength concavo-convex structure 2 is 0.7 (F=0.7) with respect to the medium where the refractive index of a wavelength of 660 nm is 2.147 (n=2.147), the effective refractive index in the TE direction of the sub-wavelength concavo-convex structure is 1.878 (n(TE, DVD)=1.878) and the effective refractive index in the TM direction of the sub-wavelength concavo-convex structure is 1.488 (n(TM, DVD)=1.488).

Furthermore, when the filling factor of the sub-wavelength concavo-convex structure 2 is 0.7 (F=0.7) with respect to the medium where the refractive index of a wavelength of 785 nm is 2.124 (n=2.124), the effective refractive index in the TE direction of the sub-wavelength concavo-convex structure is 1.859 (n(TE, CD)=1.859) and the effective refractive index in the TM direction of the sub-wavelength concavo-convex structure is 1.482 (n(TM, CD)=1.482).

Here, when No=n (TE, DVD) and Ne=n (TM, DVD), $\Delta(\theta 2)$ is 90 degrees, No is 1.878 ($\lambda$=660 nm), Ne is 1.488 ($\lambda$=660 nm), and $\theta 2$ is 22.11 degrees. Therefore, when 220 nm is selected as d, the relationship Ne'=1.529 $\Delta(0)$=46.8 degrees$\approx \lambda/8$ is obtained according to the formula 2 described above. That is, a ⅛ wavelength plate may be used as the reflecting (¼) wavelength plate 15.

Similarly, when the values described above are used for a CD, $\Delta(\theta 2)$ is about 72 degrees. The values may be used if importance is placed on a DVD-system phase difference. When it is desired that $\Delta(\theta 2)$ fall within about 90 degrees ±10% as for a CD-system, $\Delta(\theta 2)$ may be designed to be 90 degrees at a wavelength of about 722 nm as the center of the DVD-system and CD-system wavelengths.

Furthermore, the first embodiment refers to a case in which the filling factor is 0.7 (F=0.7). The filling factor is not limited to this, but other filling factors may be used. In other words, a case in which the filling factor is 0.5 (F=0.5) is desirable for processing the grooves of the sub-wavelength concavo-convex structure in that the groove depth becomes the smallest. The processing of the grooves of the sub-wavelength concavo-convex structure is difficult if the filling factor is too small or too large. If the filling factor is too small, the sub-wavelength concavo-convex structure is easily fallen during being processed or after being completed due to its thin structure. Furthermore, if the filling factor is too large, problems such as stopping the groove processing at an etching process are likely to occur. Therefore, the filling factor F is desirably in the range of 0.5±0.2 in terms of processing the grooves of the sub-wavelength concavo-convex structure and reliability of the product.

Note that the first embodiment refers to the (¼) wavelength plate that converts the emitted light from the light source into the circular polarized light and the reflected light from the optical recording medium into the linear polarized light. If $\Delta(\theta 2)$ is designed to be 180 degrees, a (½) wavelength plate which rotates the polarization direction of the emitted light from the light source by 90 degrees can be obtained. Furthermore, similar to the reflecting film described in Patent Document 1, it is desired that the reflecting film be designed in consideration of a phase difference.

Here, a description is specifically made of the reflecting (¼) wavelength plate and the reflecting wavelength plate provided in the optical pickup according to the second embodiment of the present invention.

The reflecting (¼) wavelength plate 16 according to the second embodiment shown in FIG. 6 is the same in configuration as the reflecting (¼) wavelength plate 15 according to the first embodiment except that the reflecting film 16*d* is a dichroic coat formed of a dielectric multilayer film that reflects light having a wavelength of 660 nm and light having a wavelength of 785 nm and allows permeation of light having a wavelength of 405 nm (see FIG. 7A).

It is required that the pitch P of the sub-wavelength concavo-convex structure be substantially smaller than a used wavelength. Since the wavelength plate according to the second embodiment allows permeation of light having a wavelength of 405 nm, the pitch P is desirably less than or equal to a half-wavelength of 202.5 nm so that the light having a wavelength of 405 nm is not affected by diffraction.

Furthermore, the reflecting wavelength plate 25 shown in FIG. 6 is described. The reflecting (¼) wavelength plate 16 also adds a phase difference to light having a wavelength of 405 nm that permeates the reflecting (¼) wavelength plate 16 and is incident on the reflecting wavelength plate 25. Therefore, the reflecting wavelength plate 25 must be configured in consideration of the phase difference added by the reflecting (¼) wavelength plate 16. In other words, it is required that both the phase difference of the reflecting (¼) wavelength plate 16 and that of the reflecting wavelength plate 25 be taken into consideration so that the ¼ wavelength plate functions.

Next, the phase difference that the light having a wavelength of 405 nm receives at the time of permeating the reflecting (¼) wavelength plate 16 is calculated.

Figure 22:
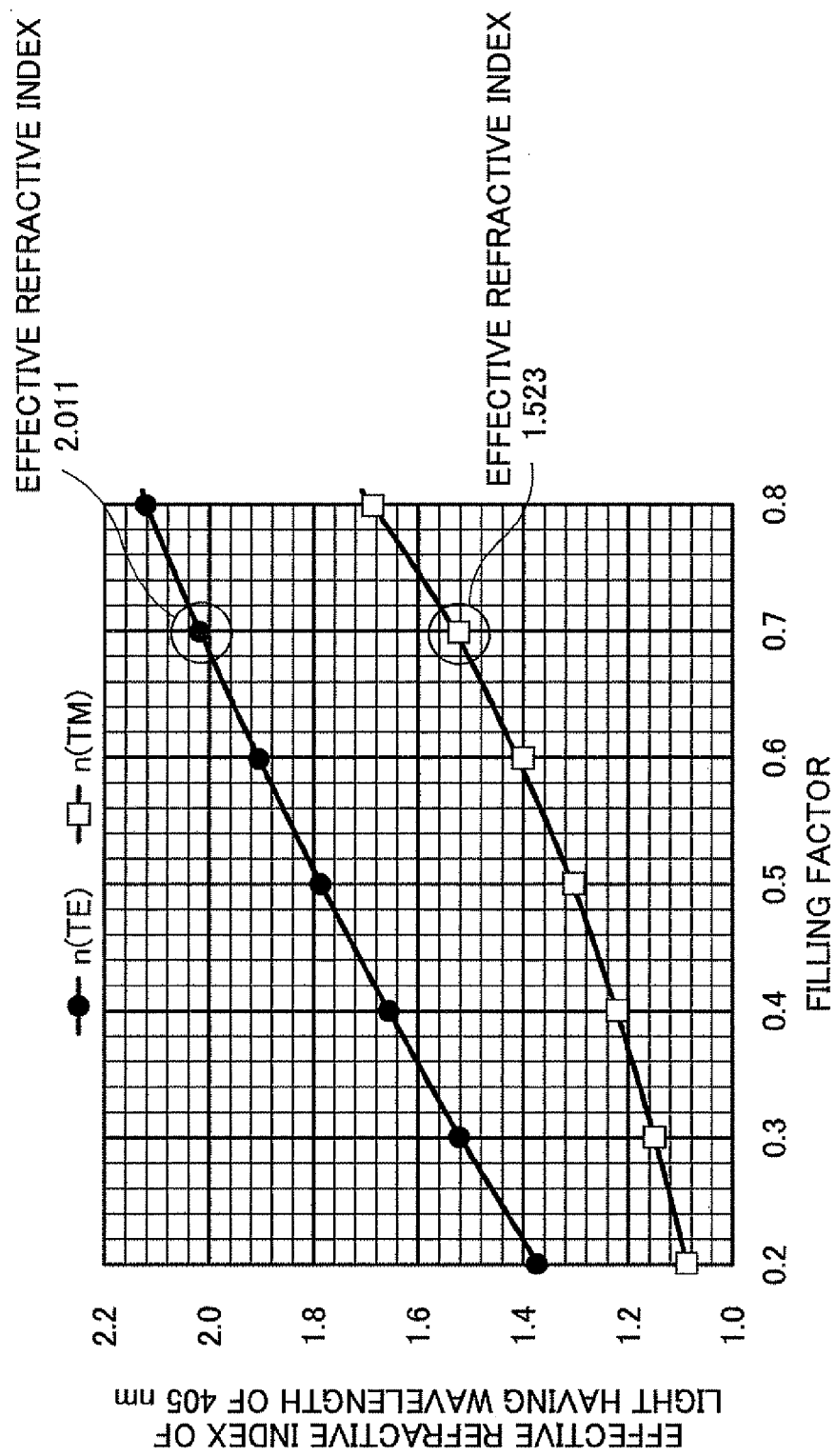
FIG. 22 is a graph showing refractive indexes corresponding to polarization directions with respect to filling factors of light having a wavelength of 405 nm.

FIG. 22 is a graph showing refractive indexes corresponding to polarization directions with respect to filling factors. FIG. 22 shows an example of calculation results of the respective refractive indexes. To calculate the refractive indexes, the refractive index n (BD) (=2.313) of a wavelength of 405 nm of $Ta_2O_5$ (tantalum pentoxide) is used.

At this time, the phase difference of the sub-wavelength concavo-convex structure is obtained as follows.

In the case of a BD, the phase difference $\Delta(BD)$ of the sub-wavelength concavo-convex structure when light is incident in the X-axis direction shown in FIGS. 3A and 3B is obtained by the following formula.

$$\Delta(BD) = \left| \left( \frac{2\pi}{405 \text{ nm}} \right) \times (n(TM, BD) \times d - n(TE, BD) \times d) \right| \quad \text{(Formula 16)}$$

As described above, the filling factor of the sub-wavelength concavo-convex structure 2 of the reflecting (¼) wavelength plate 16 is 0.7 (F=0.7) and the groove depth thereof is 220 nm (d=220 nm).

When the wavelength of light is 405 nm and the refractive index is 2.313, the effective refractive index in the TE direction of the sub-wavelength concavo-convex structure is 2.011 (n(TE, BD)=2.011), the effective refractive index in the TM direction of the sub-wavelength concavo-convex structure is 1.523 (n(TM, BD)=1.523), and the phase difference ($\Delta(BD)$) is 0.53$\pi$ ($\Delta(BD)$=0.53$\pi$).

Furthermore, specific numerical values of the reflecting wavelength plate 25 are described below. As described above, light having a wavelength of 405 nm receives the phase difference of 0.53 $\pi$ (=95.4 degrees) at the time of permeating the reflecting (¼) wavelength plate 16. Therefore, the reflecting wavelength plate 25 must be configured in consideration of the phase difference added by the reflecting (¼) wavelength plate 16.

First, the pitch P of the sub-wavelength concavo-convex structure is substantially smaller than a used wavelength. The pitch P is smaller than a wavelength of 405 nm of the light source for a BD on a short wavelength side and desirably less than or equal to a half-wavelength of 202.5 nm.

When the filling factor of the sub-wavelength concavo-convex structure 2 is 0.7 (F=0.7) with respect to the medium where the refractive index of a wavelength of 405 nm is 2.313 (n=2.313), the effective refractive index in the TE direction of the sub-wavelength concavo-convex structure is 2.011 (n(TE, BD)=2.011) and the effective refractive index in the TM direction of the sub-wavelength concavo-convex structure is 1.523 (n(TM, BD)=1.523). Here, when No=n (TE, BD) and Ne=n (TM, BD), No is 2.011 ($\lambda$=405 nm), Ne is 1.523 ($\lambda$=405 nm), and θ2 is 20.59 degrees. Therefore, d=12.7 is obtained from the relationship Ne'=1.565Δ(θ2)=95.4−90 according to the formula 2 described above.

Here, a description is specifically made of the reflecting (¼) wavelength plate and the reflecting wavelength plate provided in the optical pickup according to the third embodiment of the present invention.

The reflecting (¼) wavelength plate 26 according to the third embodiment shown in FIG. 8 is the same in configuration as the reflecting (¼) wavelength plate 16 according to the second embodiment except that the reflecting film 26d is a dichroic coat formed of a dielectric multilayer film that reflects light having a wavelength of 405 nm and allows permeation of light having a wavelength of 660 nm and light having a wavelength of 785 nm (see FIG. 9A).

As described above, from an example of the calculation results of the refractive indexes corresponding to the polarization directions with respect to the filling factors shown in FIG. 22, the refractive index n (BD) (=2.313) of a wavelength of 405 nm of Ta$_2$O$_5$ (tantalum pentoxide) is used.

At this time, the phase difference of the sub-wavelength concavo-convex structure is obtained as follows.

In the case of a BD, the phase difference Δ(BD) of the sub-wavelength concavo-convex structure when light is incident in the X-axis direction shown in FIGS. 3A and 3B is obtained by the following formula.

$$\Delta(BD) = \left| \left( \frac{2\pi}{405 \text{ nm}} \right) \times (n(TM, BD) \times d - n(TE, BD) \times d) \right| \quad \text{(Formula 17)}$$

When the filling factor of the sub-wavelength concavo-convex structure 2 of the reflecting (¼) wavelength plate 26 is 0.7 (F=0.7) with respect to the medium where the refractive index of a wavelength of 405 nm is 2.313 (n=2.313), the effective refractive index in the TE direction of the sub-wavelength concavo-convex structure is 2.011 (n(TE, BD)=2.011) and the effective refractive index in the TM direction of the sub-wavelength concavo-convex structure is 1.523 (n(TM, BD)=1.523). Similar to the above embodiment, a λ/8 wavelength plate may be used as the reflecting (¼) wavelength plate 15, and the groove depth may be 256 nm (d=256 nm).

Furthermore, the reflecting wavelength plate 35 shown in FIG. 8 is described. The reflecting (¼) wavelength plate 26 also adds a phase difference to light having a wavelength of 660 nm and light having a wavelength of 785 nm that permeate the reflecting (¼) wavelength plate 26 and are incident on the reflecting wavelength plate 35. Therefore, the reflecting wavelength plate 35 must be configured in consideration of the phase difference added by the reflecting (¼) wavelength plate 26. In other words, it is required that both the phase difference of the reflecting (¼) wavelength plate 26 and that of the reflecting wavelength plate 35 be taken into consideration so that the ¼ wavelength plate functions.

Next, the phase difference that light having a wavelength of 606 nm and light having a wavelength of 785 nm receive at the time of permeating the reflecting (¼) wavelength plate 26 is calculated.

FIG. 20 is a graph showing refractive indexes corresponding to polarization directions with respect to filling factors. FIG. 20 shows an example of calculation results of the respective refractive indexes. To calculate the refractive indexes, the refractive index n (DVD) (=2.147) of a wavelength of 660 nm of Ta$_2$O$_5$ (tantalum pentoxide) is used.

FIG. 21 is a graph showing refractive indexes corresponding to polarization directions with respect to filling factors. FIG. 21 shows an example of calculation results of the respective refractive indexes. To calculate the refractive indexes, the refractive index n (CD) (=2.124) of a wavelength of 785 nm of Ta$_2$O$_5$ (tantalum pentoxide) is used.

At this time, the phase difference of the sub-wavelength concavo-convex structure is obtained as follows.

In the case of a DVD, the phase difference Δ(DVD) of the sub-wavelength concavo-convex structure when light is incident in the X-axis direction shown in FIGS. 3A and 3B is obtained by the following formula.

$$\Delta(DVD) = \left| \left( \frac{2\pi}{660 \text{ nm}} \right) \times (n(TM, DVD) \times d - n(TE, DVD) \times d) \right| \quad \text{(Formula 18)}$$

In the case of a CD, the phase difference Δ(CD) of the sub-wavelength concavo-convex structure when light is incident in the X-axis direction shown in FIGS. 3A and 3B is obtained by the following formula.

$$\Delta(CD) = \left| \left( \frac{2\pi}{785 \text{ nm}} \right) \times (n(TM, CD) \times d - n(TE, CD) \times d) \right| \quad \text{(Formula 19)}$$

As described above, the filling factor of the sub-wavelength concavo-convex structure 2 of the reflecting (¼) wavelength plate 26 is 0.7 (F=0.7) and the groove depth thereof is 256 nm (d=256 nm).

In the case of the medium where the refractive index of a wavelength of 660 nm is 2.147, the effective refractive index in the TE direction of the sub-wavelength concavo-convex structure is 1.878 (n(TE, DVD)=1.878) and the effective refractive index in the TM direction of the sub-wavelength concavo-convex structure is 1.488 (n(TM, DVD)=1.488). In the case of the medium where the refractive index of a wavelength of 785 nm is 2.124, the effective refractive index in the TE direction of the sub-wavelength concavo-convex structure is 1.859 (n(TE, CD)=1.859) and the effective refractive index in the TM direction of the sub-wavelength concavo-convex structure is 1.482 (n(TM, CD)=1.482). The phase difference (Δ(DVD)) is 0.15 π, and the phase difference (Δ(CD)) is 0.12 π.

Here, specific numerical values of the reflecting wavelength plate 35 are described. As described above, light having a wavelength of 660 nm receives a phase difference of 0.15 π (=27 degrees) at the time of permeating the reflecting (¼) wavelength plate 26. Furthermore, light having a wavelength of 785 nm receives a phase difference of 0.12 π (=21.6 degrees) at the time of permeating the reflecting (¼) wavelength plate 26. Therefore, the reflecting wavelength plate 35 must be configured in consideration of the phase differences.

For example, if importance is placed on light having a wavelength of 660 nm, the reflecting wavelength plate 35 may be so configured that the DVD phase difference when the light having a wavelength of 660 nm permeates the reflecting wavelength plate 35 Δ(DVD) is equal to 90-27. Furthermore, if importance is placed on light having a wavelength of 785 nm, the reflecting wavelength plate 35 may be so configured that the CD phase difference when the light having a wavelength of 785 nm permeates the reflecting wavelength plate 35 Δ(CD) is equal to 90-21.6.

Alternatively, the groove depth of the reflecting wavelength plate 35 may be so selected that the following relationships are met.

Δ(DVD)=90−(27+21.6)/2

Δ(CD)=90−(27+21.6)/2

Furthermore, the pitch P of the sub-wavelength concavo-convex structure is substantially smaller than a used wavelength. The pitch P is smaller than a wavelength of 660 nm of the light source for a DVD on a short wavelength side and desirably less than or equal to a half-wave length of 330 nm.

In the above embodiments, the phase difference is set to 90 degrees so as to realize the ¼ wavelength plate. However, it is recognized that the ¼ wavelength plate provided in a commercially-available device satisfactorily exercises its performance if the phase difference is about 90±5 degrees. Furthermore, a monitoring light-receiving element for controlling the power of the light source may be arranged subsequent to the ¼ wavelength plate. In this, case, a dielectric multilayer film that allows permeation of the light incident on the monitoring light-receiving element by about 5% may be used as the reflecting film of the reflecting wavelength plate.

Furthermore, in the above embodiments, a phase difference at the surface of the reflecting film is not taken into consideration. However, the phase difference (for example, phase difference: Δ(Z)) may be actually generated at the surface of the reflecting film in accordance with a material. In this case, the groove depth may be determined so that the phase difference at the ¼ wavelength plate is generated in consideration of the value of the phase difference at the surface of the reflecting film. In other words, the groove depth may be determined so that the phase difference in the sub-wavelength concavo-convex structure is obtained by (kπ)/8π−Δ(Z).

Next, a description is made of the reflecting (¼) wavelength plate 36 provided in the optical pickup according to the fourth embodiment of the present invention.

The reflecting (¼) wavelength plate 36 according to the fourth embodiment shown in FIG. 10 has the sub-wavelength concavo-convex structures 36c and 36f at its both surfaces (see FIG. 11A). The sub-wavelength concavo-convex structure 36c on the side of the light source has the same configuration as the sub-wavelength concavo-convex structure 16c according to the second embodiment (see FIG. 7A). On the other hand, the sub-wavelength concavo-convex structure 36f formed at the surface on the side opposite to the light source is different only in groove depth from the sub-wavelength concavo-convex structure formed at the reflecting wavelength plate 25 (see FIG. 6) according to the second embodiment.

In the fourth embodiment, the groove depth of the sub-wavelength concavo-convex structure 36 is twice as large as the sub-wavelength concavo-convex structure of the reflecting wavelength plate 26 so that the reflecting (¼) wavelength plate 36 serves as the transmission (¼) wavelength plate with respect to the light having a wavelength of 405 nm.

Next, a description is made of the reflecting (¼) wavelength plate 56 provided in the optical pickup according to the fifth embodiment of the present invention.

The reflecting (¼) wavelength plate 56 according to the fifth embodiment shown in FIG. 13 has the sub-wavelength concavo-convex structures 56c and 56f at its both surfaces (see FIG. 14A). The sub-wavelength concavo-convex structure 56c on the side of the light source has the same configuration as the sub-wavelength concavo-convex structure 26c according to the third embodiment (see FIG. 9A). On the other hand, the sub-wavelength concavo-convex structure 56f formed at the surface on the side opposite to the light source is different only in groove depth from the sub-wavelength concavo-convex structure formed at the reflecting wavelength plate 35 (see FIG. 8) according to the third embodiment.

In the fifth embodiment, the groove depth of the sub-wavelength concavo-convex structure 56 is twice as large as the sub-wavelength concavo-convex structure of the reflecting wavelength plate 35 according to the third embodiment so that the reflecting (¼) wavelength plate 56 serves as the transmission (¼) wavelength plate with respect to the light having a wavelength of 660 nm and the light having a wavelength of 785 nm.

Next, a description is made of a procedure for manufacturing the wavelength plate according to the embodiments of the present invention. Here, a method for manufacturing a format is described prior to a method for manufacturing an element.

Figure 23A:
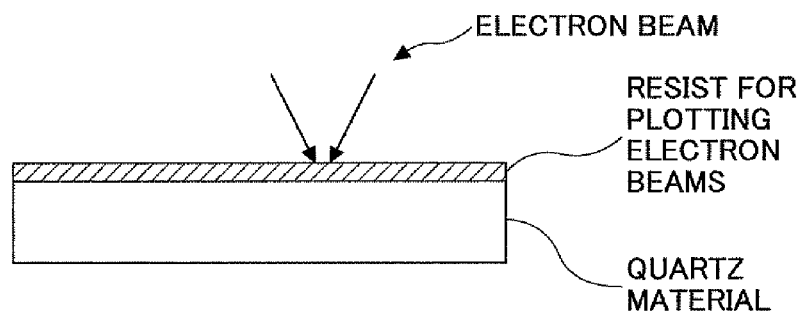
FIGS. 23A through 23D are diagrams for explaining a method for manufacturing a format using quartz as a base material.

FIGS. 23A through 23D are views for explaining the method for manufacturing the format using quartz as a base material. In FIG. 23A, the front surface of a quartz material serving as a base substrate is coated with a resist for plotting electron beams having a predetermined thinness and pre-baked. Based on a prescribed program, plotting is performed on the resist so as to determine a pitch and a line width corresponding to the specifications of the wavelength plate.

Figure 23B:
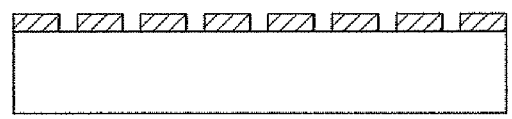

In FIG. 23B, the resist is subjected to development and rinse. Thus, the sub-wavelength concavo-convex structure is formed on the resist. At the bottoms of the grooves, the quartz material is exposed.

Figure 23C:
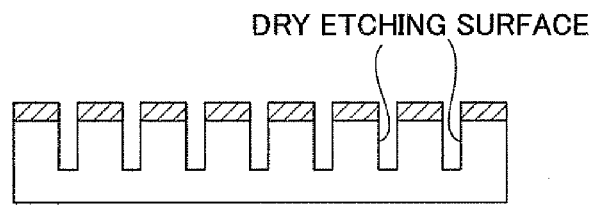

In FIG. 23C, the quartz is subjected to dry etching using the resist pattern of the sub-wavelength concavo-convex structure as a mask. In performing the etching, etching equipment such as RIE equipment, NLD equipment, and TCP equipment uses CF4 gas or CF3 gas. When bias is applied to the substrate, the surface of the substrate is progressively perpendicularly etched.

Figure 23D:
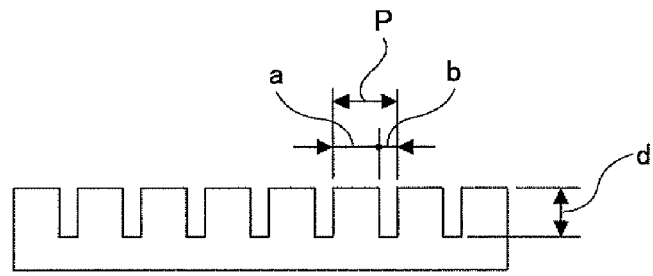

In FIG. 23D, the resist is removed. One method for removing the resist is to introduce oxygen gas into a dry etching device to remove the resist in oxygen gas plasma. Another method for removing the resist is to take the substrate from the equipment and subject it to CAROS washing. The format thus completed is used as a quartz format.

FIGS. 24A through 24D are views for explaining a method for manufacturing a format using silicon as a base material The following method is not necessarily limited to a method for manufacturing a silicon substrate. In the same manner, it is also possible to manufacture a format using a silicon film formed on a quartz substrate by a sputtering method, a CVD method, or the like.

Figure 24A:
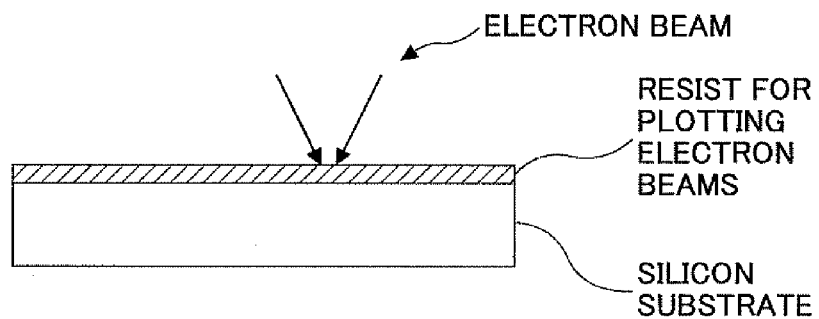
FIGS. 24A through 24D are diagrams for explaining a method for manufacturing a format using silicon as a base substrate.

In FIG. 24A, the front surface of silicon serving as a base substrate is coated with a resist for plotting electron beams having a predetermined thinness and pre-baked. Based on a prescribed program, plotting is performed on the resist so as to determine a pitch and a line width corresponding to the specifications of the wavelength plate.

Figure 24B:

In FIG. 24B, the resist is subjected to development and rinse. Thus, the sub-wavelength concavo-convex structure is formed on the resist. At the bottoms of the grooves, the silicon material is exposed.

Figure 24C:
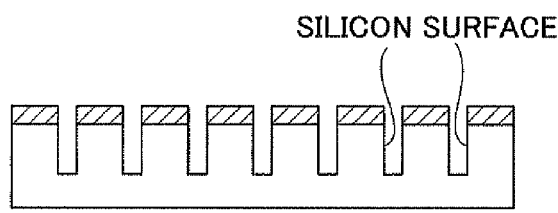

In FIG. 24C, the silicon is subjected to alkali wet-etching (with a KOH solution) using the resist pattern of the sub-wavelength concavo-convex structure as a mask. The silicon substrate is etched in a depth direction with its pitch maintained as the walls of silicon surfaces. Note that as described above, it is also possible to manufacture a format using a silicon film formed on a quarts substrate by a sputtering method, a CVD method, or the like. In this case, a similar structure can be manufactured by dry etching using a Bosch process.

Figure 24D:
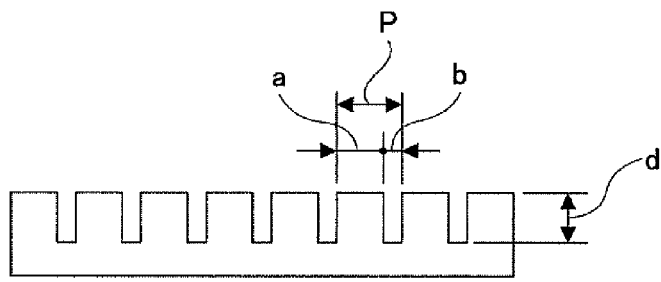

In FIG. 24D, the resist is removed. The format thus completed is used as a silicon format. For the sake of convenience, the quartz format or the silicon format manufactured in the above manner are called a mold in some cases.

FIGS. 25A through 25H are views showing a procedure for forming an Al (aluminum) film serving as a reflecting film on a glass substrate, forming a $Ta_2O_5$ (tantalum pentoxide) film for expressing a phase difference on the Al film, and forming the wavelength plate on the $Ta_2O_5$ film.

Figure 25A:
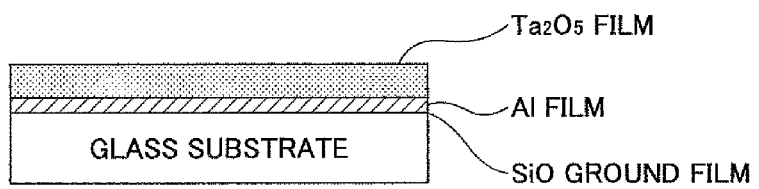
FIGS. 25A through 25H are views showing a procedure for forming the wavelength plate on a glass substrate using a mold.
Figure 25B:
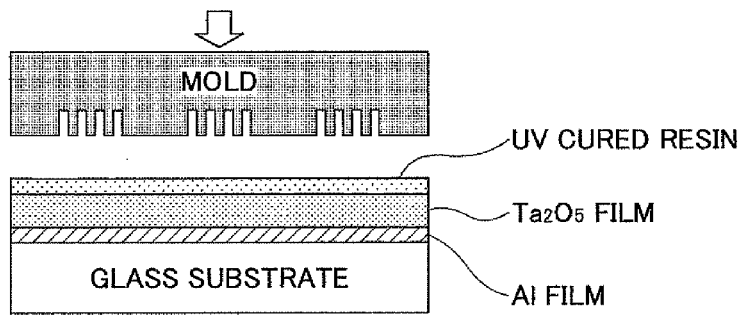

In FIG. 25A, the Al film and the $Ta_2O_5$ film are formed on the front surface of the glass substrate. A vacuum vapor deposition method and a sputtering method are used for forming the Al film (including a SiO (silicon monoxide) ground film as an adhesion improving film) and the $Ta_2O_5$ film, respectively, under the following conditions.

The SiO Ground Film (Forming the Adhesion Improving Film) of the Al Film
1. Substrate temperature: less than or equal to 40° C.
2. Film forming pressure: $8 \times 10^{-2}$ Pa
3. Film forming speed: 3.0 Å/sec
4. Film thickness: 100 through 150 Å
5. Electron beam (EB) vapor deposition method
Al Film (Reflecting Film)
1: Substrate temperature: less than or equal to 40° C.
2. Film forming pressure: $9 \times 10^{-3}$ Pa
3. Film forming speed: 8.0 Å/sec
4. Film thickness: 1500 through 2000 Å
5. Resistance heating vapor deposition method (current value: 400 through 450 Å)
6. Reflectivity: greater than or equal to 91%
The $Ta_2O_5$ Film
1: Substrate temperature: 70 through 100° C.
2. Film forming pressure: 5 through $8 \times 10^{-1}$ Torr
3. Film forming speed: 0.7 through 1.0 Å/sec
4. RF power: 300 through 500 W In FIG. 25B, a UV cured resin is coated on the $Ta_2O_5$ film and then pressed by a mold from the above. A silicon mold and a quartz mold may be used as the mold. However, the quartz mold is more suitable for nano-imprint for forming a fine structure because it has light transmission characteristics. As the UV cured resin, a PAC-01 (manufactured by Toyo Gosei Co., Ltd.) is used. Furthermore, when a thermosetting transfer material is used, a silicon mold may be used.

Figure 25C:
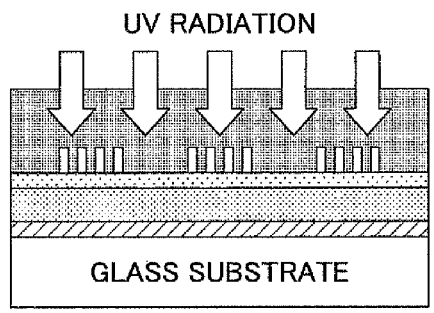

In FIG. 25C, UV (Ultraviolet) rays are radiated from the back surface of the mold to fix the resin. Furthermore, when the silicon mold is used, UV rays are radiated from the side of the substrate.

Figure 25D:
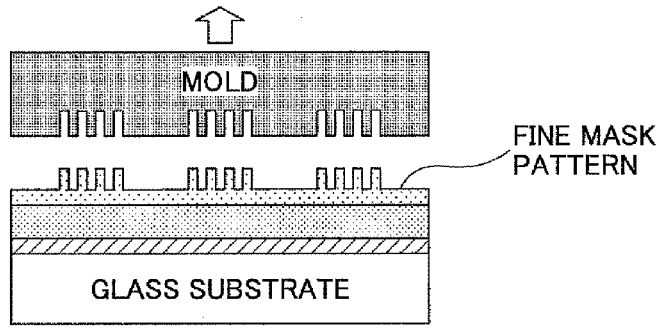

In FIG. 25D, the mold is removed. A mask pattern having a convex-shaped fine structure is formed in the UV cured resin.

Figure 25E:
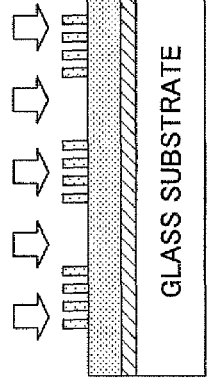
Figure 25F:
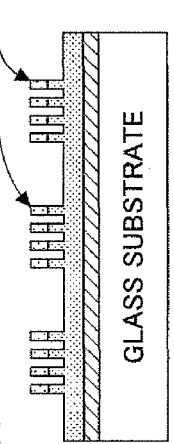

In FIG. 25E, the UV cured resin is subjected to dry etching until the $Ta_2O_5$ film is exposed. Elimination of this process is possible if the shape of the mask pattern can be transferred in a state in which the resin layer does not exist at the lowermost part.

The dry etching is performed under the following conditions.
1. Gas type: oxygen gas ($O_2$)
2. Gas inflow amount: 20 sccm
3. Pressure: 0.4 Pa
4. Resin etching speed: 30 nm/sec
5. Upper bias power: 1 KW
6. Lower bias power: 100 W In FIG. 25F, the dry etching is repeatedly performed until the grooves of the $Ta_2O_5$ film have a desired depth.

At this time, the dry etching is performed under the following conditions.
Etching equipment: RIE (Rainbow 4500 in parallel plain plate RF application Sprit Power system manufactured by Sumitomo Metal Industries, Ltd.)
Operating Conditions
Upper electrode power: 200 W
Lower electrode power: 200 W
Interval between electrodes: 9.5 mm
Upper electrode temperature: 10° C.
Lower electrode temperature: 10° C.
Gas Type
CF4=30 sccm, CHF3=60 sccm, Ar=100 sccm, He=5 sccm
Pressure inside reaction chamber: 30 Pa
Etching speed for $Ta_2O_5$ film: 8 nm/sec At this time, the pattern valley parts of the $Ta_2O_5$ film may slightly remain without being completely etched (see FIG. 25G). The remaining film amount at the valley parts influences a phase difference, but a relationship between the remaining film amount and the influence on the phase difference can be calculated in advance by simulation. Accordingly, when the remaining film amount of the $Ta_2O_5$ film, the refractive index of the $Ta_2O_5$ film, the filling factor, the pitch, the depth, and the like are optimized, the phase difference of a desired wavelength plate can be ensured.

Figure 25G:
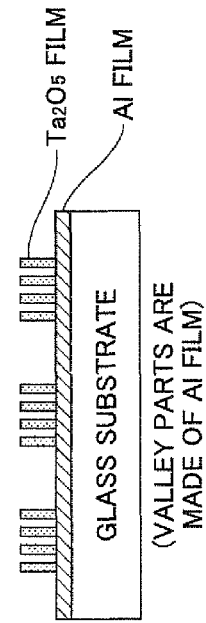
Figure 25H:
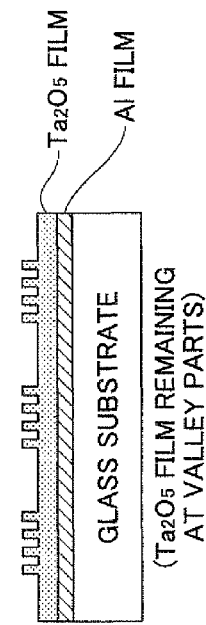

Furthermore, even if the Al film appears when the $Ta_2O_5$ film is slightly over-etched to remove the valley parts of the $Ta_2O_5$ film, no problem arises (FIG. 25H). In this case, when the dry etching is performed under the above etching conditions, the etching speed for the Al film is set to be one-twentieth or slower than that for the $Ta_2O_5$ film. In other words, when the $Ta_2O_5$ film is etched by 20 nm, the Al film is etched by only 10 nm (10 Å or smaller). The Al film formed as a reflecting film serves also as an etching stop film when the $Ta_2O_5$ film is etched. In this case, the valley parts of the $Ta_2O_5$ film can be completely removed in a state in which the reflectivity of the Al film is not influenced.

Finally, the resin mask remaining at the uppermost part is removed by the separation process of the dry etching in oxygen gas (plasma). FIG. 25G shows a completed wavelength plate. The wavelength plate is formed by the $Ta_2O_5$ film on the glass substrate.

FIGS. 26A through 26G are views for explaining a method for manufacturing the wavelength plate without using a mold, and are views showing a procedure for forming an Al film serving as a reflecting film on a glass substrate, forming a $Ta_2O_5$ (tantalum pentoxide) film for expressing a phase difference on the Al film, and forming the wavelength plate on the $Ta_2O_5$ film.

Figure 26A:
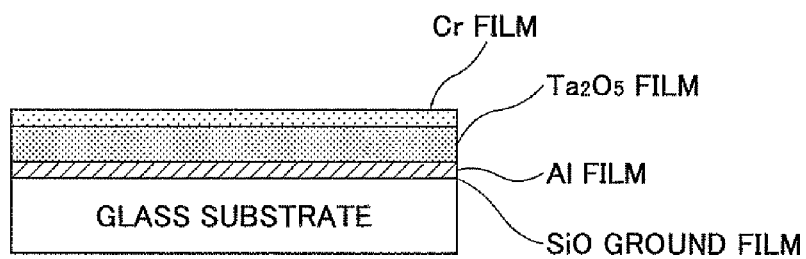
FIGS. 26A through 26G are views showing a procedure for forming the wavelength plate on the glass substrate without using the mold.
Figure 26B:
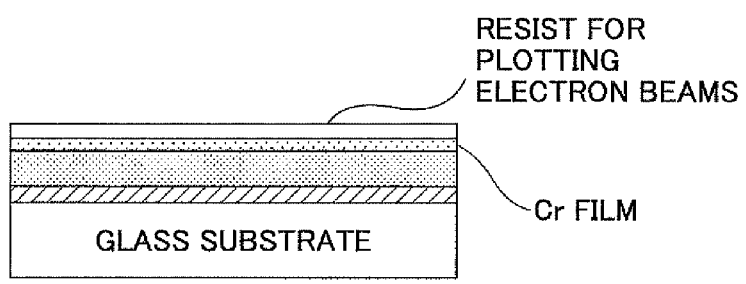

In FIG. 26A, the Al film and the $Ta_2O_5$ film are formed on the front surface of the glass substrate. A vacuum vapor deposition method and a sputtering method are used for forming the Al film and the $Ta_2O_5$ film, respectively, under the following conditions.

The Ground Film (Adhesion Improving Film) of the Al Film
1. Substrate temperature: less than or equal to 40° C.
2. Film forming pressure: $8\times10^{-2}$ Pa
3. Film forming speed: 3.0 Å/sec
4. Film thickness: 100 through 150 Å
5. Electron beam (EB) vapor deposition method The Al Film (Reflecting Film)
1: Substrate temperature: less than or equal to 40° C.
2. Film forming pressure: $9\times10^{-3}$ Pa
3. Film forming speed: 8.0 Å/sec
4. Film thickness: 1500 through 2000 Å
5. Resistance heating vapor deposition method (current value: 400 through 450 Å)
6. Reflectivity: greater than or equal to 91%

The $Ta_2O_5$ Film
1: Substrate temperature: 70 through 100° C.
2. Film forming pressure: 5 through $8\times10^{-4}$ Torr
3. Film forming speed: 0.7 through 1.0 Å/sec
4. RF power: 300 through 500 W In addition, a Cr (Chrome) film is formed on the $Ta_2O_5$ film. As a method for forming the Cr film, a sputtering method is used under the following conditions.
1. Substrate temperature: 70 through 100° C.
2. Film forming pressure: 7 through $8\times10^{-4}$ Torr
3. Film forming speed: 0.5 through 1.0 Å/sec
4. RF power: 100 through 200 W In FIG. 26B, a resist for plotting electron beams is coated on the Cr film.

Figure 26C:
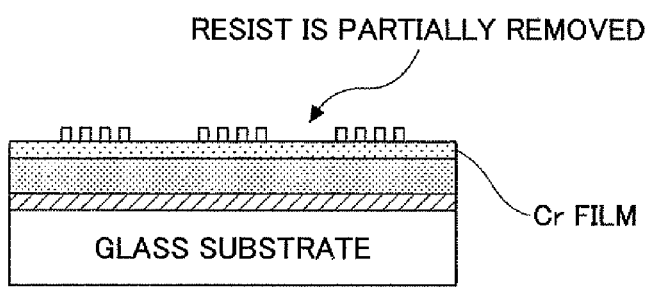

In FIG. 26C, an i-line stepper is used by a "high accuracy fine width exposure device." After the exposure, the resist is partially removed by way of a development process. As a result, the Cr film is exposed. The remaining resist serves as a mask pattern for etching the Cr film described below.

Figure 26D:
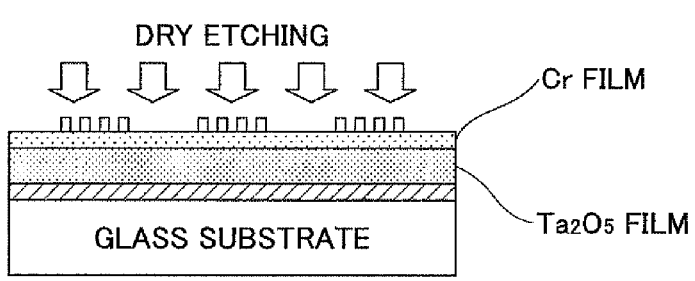
Figure 26E:
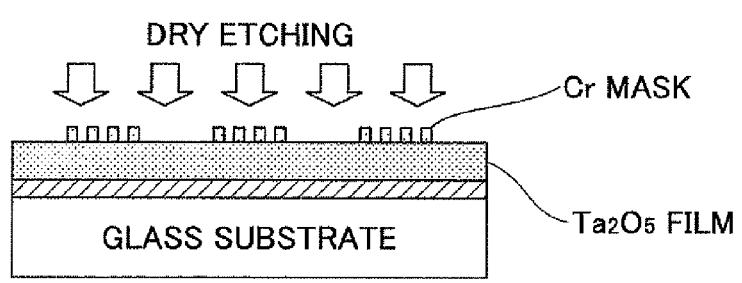

In FIG. 26D, the Cr film is subjected to dry etching until the $Ta_2O_5$ film is exposed. The dry etching for the Cr film is performed under the following conditions.
Etching equipment: RIE (Rainbow 4720 in parallel plain plate RF application Plasma mode system manufactured by Sumitomo Metal Industries, Ltd.)
Operating Conditions
Upper electrode power: 400 W
Lower electrode power: 80 W
Interval between electrodes: 12 mm
Upper electrode temperature: 0° C.
Lower electrode temperature: 20° C.
Gas Type
Ar=50 sccm, $O_2$=20 sccm, $Cl_2$=80 sccm
Pressure inside reaction chamber: 35 Pa In FIG. 26E, the dry etching is repeatedly performed until the grooves of the $Ta_2O_5$ film have a desired depth.

At this time, the dry etching is performed under the following conditions.
Etching equipment: RIE (Rainbow 4500 in parallel plain plate RF application Sprit Power system manufactured by Sumitomo Metal Industries, Ltd.)
Operating Conditions
Upper electrode power: 200 W
Lower electrode power: 200 W
Interval between electrodes: 9.5 mm
Upper electrode temperature: 10° C.
Lower electrode temperature: 10° C.
Gas Type
CF4=30 sccm, CHF3=60 sccm, Ar=100 sccm, He=5 sccm
Pressure inside reaction chamber: 30 Pa
Etching speed for $Ta_2O_5$ film: 8 nm/sec At this time, the pattern valley parts of the $Ta_2O_5$ film may slightly remain without being completely etched. The remaining film amount at the valley parts influences a phase difference, but a relationship between the remaining film amount and the influence on the phase difference can be calculated in advance by simulation. Accordingly, when the remaining film amount of the $Ta_2O_5$ film, the refractive index of the $Ta_2O_5$ film, the filling factor, the pitch, the depth, and the like are optimized, the phase difference of a desired wavelength plate can be ensured.

Figure 26F:
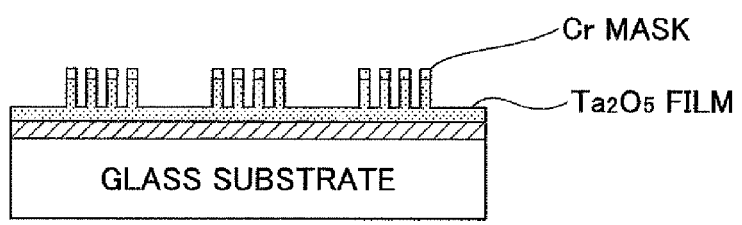

In FIG. 26F, finally, the Cr mask remaining at the uppermost part is removed by wet etching in a Cr separation solution.

Figure 26G:
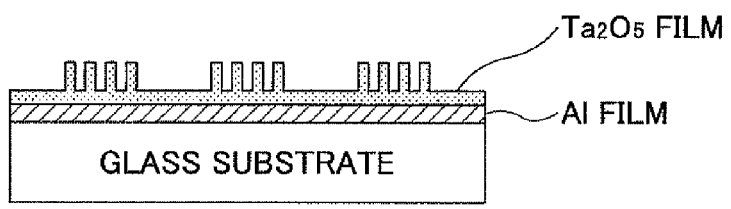

FIG. 26G shows a completed wavelength plate. The wavelength plate has the $Ta_2O_5$ film and the Al reflecting film at one surface of the glass substrate.

Figure 27:
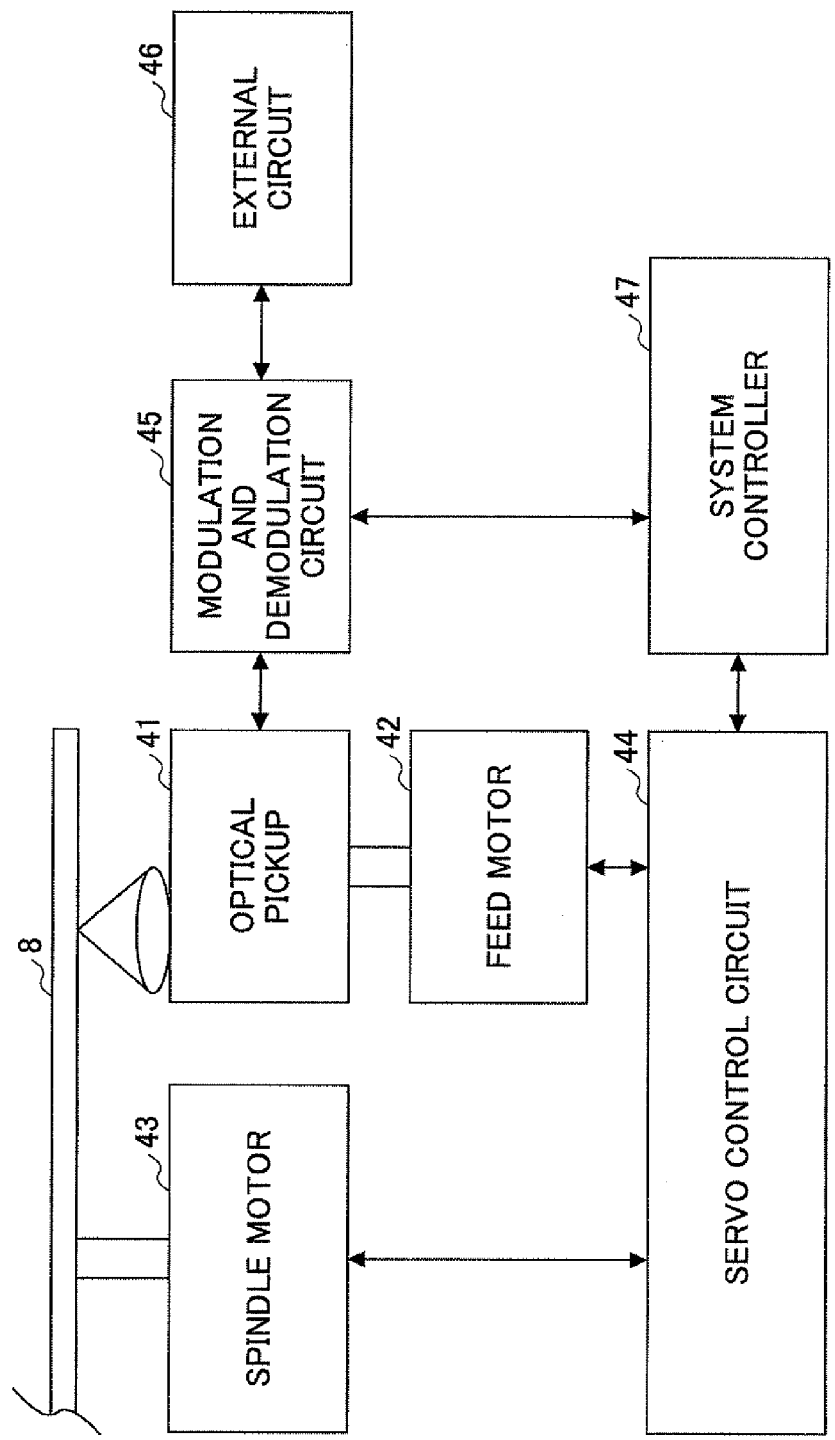
FIG. 27 is a block diagram showing the schematic configuration of an optical information processing apparatus having the optical pickup according to the embodiments of the present invention.

FIG. 27 is a block diagram showing the schematic configuration of an optical information processing apparatus having the optical pickup using the optical element according to the embodiments of the present invention. A description is now made of the configuration with reference to FIG. 27.

The optical information processing apparatus performs the recording and reproduction of an information signal with respect to the optical recording medium 8 and has the optical pickup 41 described above. The optical information processing apparatus has a spindle motor 43 for rotating the optical recording medium 8; the optical pickup 41 used for performing the recording and reproduction of an information signal; a feed motor 42 for moving the optical pickup 41 to the inner or outer periphery of the optical recording medium 8; a modulation and demodulation circuit 45 for performing predetermined modulation and demodulation processing; a servo control circuit 44 for controlling the servo of the optical pickup or the like; and a system controller 47 for controlling the entirety of the optical information processing apparatus. Next, a description is made of the operations of the optical information processing apparatus.

The spindle motor 43 is driven and controlled by the servo control circuit 44 and rotated and driven at a predetermined number of rotations. In other words, the optical recording medium 8 on which the recording and reproduction of an information signal is performed is held on the drive shaft of the spindle motor 43 and rotated at a predetermined number of rotations by the spindle motor 43 which is driven and controlled by the servo control circuit 44.

As described above, when performing the recording and reproduction of an information signal with respect to the optical recording medium 8, the optical pickup 41 radiates laser light to the rotated and driven optical recording medium 8 and detects the light returned from the optical recording medium 8. The optical pickup 41 is connected to the modulation and demodulation circuit 45. At the time of recording the information signal on the optical recording medium 8, a signal, which is input from the external circuit 46 and to which predetermined modulation processing by the modulation and demodulation circuit 45 is applied, is supplied to the optical pickup 41. The optical pickup 41 radiates the laser light having been subjected to light intensity modulation to the optical recording medium 8 based on the signal supplied from the modulation and demodulation circuit 45. Furthermore, when reproducing an information signal, the optical pickup 41 radiates laser light of a constant output to the rotated and driven optical recording medium 8. The optical pickup 41 supplies a reproduction signal generated from the light returned from the optical recording medium 8 to the modulation and demodulation circuit 45.

Furthermore, the optical pickup 41 is also connected to the servo control circuit 44. When the information signal is recorded and reproduced, a focus servo signal and a trucking servo signal are generated from the light reflected by and returned from the rotated and driven optical recording medium 8. The optical pickup 41 supplies these servo signals to the servo control circuit 44.

The modulation and demodulation circuit 45 is connected to the system controller 47 and the external circuit 46. When recording an information signal on the optical recording medium 8, the modulation and demodulation circuit 45 receives the signal to be recorded on the optical recording medium 8 from the external circuit 46 under the control of the system controller 47 and applies predetermined modulation processing to the signal. The signal modulated by the modulation and demodulation circuit 45 is supplied to the optical pickup 41. Furthermore, when reproducing an information signal from the optical recording medium 8, the modulation and demodulation circuit 45 receives the signal reproduced from the optical recording medium 8 under the control of the system controller 47 and applies predetermined demodulation processing to the signal. Then, the signal demodulated by the modulation and demodulation circuit 45 is output from the modulation and demodulation circuit 45 to the external circuit 46.

When performing the recording and reproduction of an information signal, the feed motor 42 moves the optical pickup 41 to a predetermined position in the radial direction of the optical recording medium 8 and is driven based on a control signal from the servo control circuit 44. In other words, the feed motor 42 is connected to the servo control circuit 44 and controlled by the servo control circuit 44.

The servo control circuit 44 controls the feed motor 42 so that the optical pickup 41 is moved to a predetermined position opposing the optical recording medium 8 under the control of the system controller 47. Furthermore, the servo control circuit 44 is also connected to the spindle motor 43 and controls the operations of the spindle motor 43 under the control of the system controller 47. In other words, the servo control circuit 44 controls the spindle motor 43 so that the optical recording medium 8 is rotated and driven at a predetermined number of rotations when an information signal is recorded on and reproduced from the optical recording Medium 8.

When the optical element (reflecting (¼) wavelength plate) is provided in the optical pickup used in the optical information processing apparatus, the characteristics of the reflecting (¼) wavelength plate can be ensured even if plural light sources having different wavelengths are used. As a result, it is possible to perform the recording, reproduction, and deletion of information with respect to plural optical recording media of the corresponding wavelength. In addition, it is possible to thin the optical pickup and thin and downsize the optical information processing apparatus.

Since the reflecting wavelength plate according to the embodiments of the present invention can convert a polarization state of light source light and deflect the light path of the light source light, the optical system of the optical pickup can be thinned. Furthermore, since the function of the wavelength plate is realized by the sub-wavelength concavo-convex structure, the material of the reflecting wavelength plate can be arbitrarily selected. Moreover, since the groove depth of the reflecting wavelength plate is substantially equivalent to that of the (⅛) wavelength plate, the manufacturing process of the reflecting wavelength plate is facilitated. In addition, since the characteristics of the reflecting wavelength plate can be ensured even if plural light sources are used, the reflecting wavelength plate is useful for the optical pickup or the like.

The present invention can provide the following advantages.

According to the embodiments of the present invention, the reflecting wavelength plate converts the polarization of the light source light and deflects the light path by 90 degrees at the same time. Therefore, it is possible to reduce the width of the optical system of the optical pickup and reduce the number of assembling steps and costs for manufacturing the wavelength plate without additionally requiring a deflecting mirror or the like.

Furthermore, the function of the wavelength plate is realized by the sub-wavelength concavo-convex structure and the material of the wavelength plate can be arbitrarily selected. Therefore, it is possible to make manufacturing costs of the wavelength plate cheaper than that of crystal or the like.

Moreover, as shown, for example, in FIG. 4 of Non-Patent Document 1, it is known that the wavelength plate using the sub-wavelength concavo-convex structure has a wider operating wavelength range compared with a conventional wavelength plate using crystal. Therefore, it is possible to ensure the characteristics of the reflecting wavelength plate even if a twin-beam-type light source provided with two light sources having different wavelengths is used.

Furthermore, in the wavelength plate using the sub-wavelength concavo-convex structure, if a ratio of the groove depth to the groove width (groove depth/groove width) of the concavo-convex structure is smaller, it is possible to reduce processing time and facilitate the processing of the wavelength plate. Since retardation is generally proportional to the groove depth, the groove depth of the reflecting wavelength plate according to the embodiments of the present invention may be substantially equivalent to that of a (¼) wavelength plate. Therefore, the groove depth of the wavelength plate is required to be half or less of a conventional (¼) wavelength plate. As a result, the processing of the wavelength plate is facilitated.

Furthermore, as the reflecting film of the reflecting wavelength plate, an Al film, for example, can be used. It is possible for the Al film to serve also as an etching stop film when the sub-wavelength concavo-convex structure is manufactured by an etching process.

Moreover, compared with the configuration in which the reflecting film is provided at the rear surface of the glass substrate on the side opposite to the sub-wavelength concavo-convex structure, the configuration of the wavelength plate according to the embodiments of the present invention is hardly susceptible to absorption and deflection inside the glass substrate. That is, the thickness and deflection of the glass causes a phase difference. However, it is not preferable to manage influences due to the thickness and deflection of the glass from the viewpoint of manufacturing the wavelength plate. Conversely, since the wavelength plate according to the embodiments of the present invention has the reflecting surface provided subsequent to the sub-wavelength concavo-convex structure, the phase difference may be managed without considering the influences due to the thickness and the deflection.

According to the first and second embodiments of the present invention, the wavelength plate is provided between the objective lens and the deflecting mirror in the three-wavelength compatible optical pickup of a conventional slim type drive (see FIG. 2 in Non-Patent Document 2). On the other hand, with the provision of the reflecting wavelength plate in response to a request for thinning the optical pickup system in the slim type drive, it is possible to thin the optical system.

According to the third embodiment of the present invention, the reflecting wavelength plate A that reflects light having a wavelength of λ1 is arranged on the side closer to the light source than the reflecting wavelength plate BC that reflects light having a wavelength of λ2 and light having a wavelength of λ3. Therefore, the pitch of the reflecting wavelength plate may be less than or equal to a wavelength of λ2 (>λ1), which makes manufacturing of the reflecting wavelength plate easier than that of the reflecting manufacturing plate according to the second embodiment. As a result, yield improvements and reduced manufacturing costs are made possible.

The present invention is not limited to the specifically disclosed embodiments, and variations and modifications may be made without departing from the scope of the present invention. The present application is based on Japanese Priority Application Nos. 2008-225766 filed on Sep. 3, 2008, 2009-092975 filed on Apr. 7, 2009, and 2009-199685 filed on Aug. 31, 2009, the entire contents of which are hereby incorporated herein by reference.

What is claimed is:

1. An optical pickup used for performing recording, reproduction, or deletion of information with respect to three types of optical recording media A, B, and C having different used wavelengths, the optical pickup comprising:
a light source A that emits light having a wavelength of λ1;
a light source B that emits light having a wavelength of λ2 that is greater than λ1;
a light source C that emits light having a wavelength of λ3 that is greater than λ2;
a converging unit A that converges the light emitted from the light source A onto a recording surface as an accessed object of the optical recording medium;
a converging unit BC that converges the light emitted from the light source B and the light emitted from the light source C onto recording surfaces as accessed objects of the optical recording media;
a branch unit A that is arranged on a light path between the converging unit A and the light source A and branches a return light flux through the converging unit A;
a branch unit BC that is arranged on a light path between the converging unit BC and the light sources B and C and branches a return light flux through the converging unit BC;
a light receiving unit A that receives the return light flux branched by the branch unit A at a predetermined light receiving position;
a light receiving unit BC that receives the return light flux branched by the branch unit BC at a predetermined light receiving position;
a reflecting wavelength plate BC that is arranged on the light path between the converging unit BC and the branch unit BC; and
a reflecting mirror A' that is arranged on a light path between the converging unit A and the reflecting wavelength plate BC; wherein
the reflecting wavelength plate BC includes a substrate, a reflecting film laminated on the substrate, and a sub-wavelength concavo-convex structure 1 that is laminated on the reflecting film and has a pitch less than or equal to a wavelength of λ1, the reflecting film and the sub-wavelength concavo-convex structure 1 being laminated on a light-source-side surface of the substrate,
the reflecting wavelength plate BC is configured so that a filling factor and a groove depth of the sub-wavelength concavo-convex structure are determined so as to add a phase difference obtained by $(k\pi)/8$, where k is an integer, to the light emitted from the light source B and the light emitted from the light source C and the reflecting film reflects the light having a wavelength of λ2 and the light having a wavelength of X3 and allows permeation of the light having a wavelength of λ1,
the reflecting wavelength plate BC includes a sub-wavelength concavo-convex structure 2 that has a pitch less than or equal to a wavelength of λ1, the sub-wavelength concavo-convex structure 2 being laminated on a surface opposite to the light-source-side surface of the substrate, and
the reflecting wavelength plate BC is configured so that a filling factor and a groove depth of the sub-wavelength concavo-convex structure 2 are determined so as to add a phase difference obtained by $(k\pi)/4$, where k is an integer, when the light having a wavelength of λ1 permeates the sub-wavelength concavo-convex structure 1 and the sub-wavelength concavo-convex structure 2.

2. An optical pickup used for performing recording, reproduction, or deletion of information with respect to three types of optical recording media A, B, and C having different used wavelengths, the optical pickup comprising:
a light source A that emits light having a wavelength of λl;
a light source B that emits light having a wavelength of λ2 that is greater than λ1;
a light source C that emits light having a wavelength of λ3 that is greater than λ2;
a converging unit A that converges the light emitted from the light source A onto a recording surface as an accessed object of the optical recording medium;
a converging unit BC that converges the light emitted from the light source B and the light emitted from the light source C onto recording surfaces as accessed objects of the optical recording media;
a branch unit A that is arranged on a light path between the converging unit A and the light source A and branches a return light flux through the converging unit A;
a branch unit BC that is arranged on a light path between the converging unit BC and the light sources B and C and branches a return light flux through the converging unit BC;
a light receiving unit A that receives the return light flux branched by the branch unit A at a predetermined light receiving position;
a light receiving unit BC that receives the return light flux branched by the branch unit BC at a predetermined light receiving position;
a reflecting wavelength plate A that is arranged on the light path between the converging unit A and the branch unit A; and
a reflecting mirror BC' that is arranged on the light path between the converging unit BC and the reflecting wavelength plate A; wherein
the reflecting wavelength plate A includes a substrate, a reflecting film laminated on the substrate, and a sub-wavelength concavo-convex structure 1 that is laminated on the reflecting film and has a pitch less than or equal to a wavelength of λ1, the reflecting film and the sub-wavelength concavo-convex structure 1 being laminated on a light-source-side surface of the substrate,
the reflecting wavelength plate A is configured so that a filling factor and a groove depth of the sub-wavelength concavo-convex structure are determined so as to add a phase difference obtained by $(k\pi)/8$, where k is an integer, to the light emitted from the light source A and the reflecting film reflects the light having a wavelength of $\lambda 1$ and allows permeation of the light having a wavelength of $\lambda 2$ and the light having a wavelength of $\lambda 3$, the reflecting wavelength plate A includes a sub-wavelength concavo-convex structure 2 that has a pitch less than or equal to a wavelength of $\lambda 2$, the sub-wavelength concavo-convex structure 2 being laminated on a surface opposite to a light-source-side surface side of the substrate, and the reflecting wavelength plate A is configured so that a filling factor and a groove depth of the sub-wavelength concavo-convex structure 2 are determined so as to add a phase difference obtained by $(k\pi)/4$, where k is an integer, when the light having a wavelength of $\lambda 2$ and the light having a wavelength of $\lambda 3$ permeate the sub-wavelength concavo-convex structure 1 and the sub-wavelength concavo-convex structure 2.

* * * * *

UNITED STATES PATENT AND TRADEMARK OFFICE
CERTIFICATE OF CORRECTION

| | | |
|---|---|---|
| PATENT NO. | : 8,154,977 B2 | Page 1 of 1 |
| APPLICATION NO. | : 12/842369 | |
| DATED | : April 10, 2012 | |
| INVENTOR(S) | : Hideaki Hirai, Kazuhiro Umeki and Toshimichi Nasukawa | |

It is certified that error appears in the above-identified patent and that said Letters Patent is hereby corrected as shown below:

On the title page insert item (63)

--Continuation-in-part of application No. 12/550,997, filed August 31, 2009, now Patent No. 8,154,976--

Signed and Sealed this
Twenty-fourth Day of July, 2012

David J. Kappos
*Director of the United States Patent and Trademark Office*